(12) United States Patent
Viclizki et al.

(10) Patent No.: US 12,055,995 B2
(45) Date of Patent: Aug. 6, 2024

(54) AUTOMATIC ERROR PREDICTION IN DATA CENTERS

(71) Applicant: NVIDIA Corporation, Santa Clara, CA (US)

(72) Inventors: Tamar Viclizki, Herzeliya (IL); Fay Wang, San Jose, CA (US); Divyansh Jain, Newark, CA (US); Avighan Majumder, Pune (IN); Vadim Gechman, Harhava (IL); Vibhor Agrawal, Fremont, CA (US)

(73) Assignee: Nvidia Corporation, Santa Clara, CA (US)

( * ) Notice: Subject to any disclaimer, the term of this patent is extended or adjusted under 35 U.S.C. 154(b) by 166 days.

(21) Appl. No.: 17/683,191

(22) Filed: Feb. 28, 2022

(65) Prior Publication Data
US 2023/0297453 A1    Sep. 21, 2023

(51) Int. Cl.
*G06F 11/00* (2006.01)
*G06N 20/20* (2019.01)

(52) U.S. Cl.
CPC ........... *G06F 11/004* (2013.01); *G06N 20/20* (2019.01); *G06F 2201/86* (2013.01)

(58) Field of Classification Search
CPC ............... G06F 11/004; G06F 11/0709; G06F 11/0766; G06F 11/079; G06F 11/0793; G06F 11/3006; G06F 11/3031; G06F 11/3447; G06F 11/3452; G06F 11/1476; G06F 2201/86; G06N 20/20
See application file for complete search history.

(56) References Cited

U.S. PATENT DOCUMENTS

| | | | |
|---|---|---|---|
| 9,003,076 B2* | 4/2015 | Biem | G06F 11/3055 710/18 |
| 11,017,321 B1* | 5/2021 | Mishra | G05B 23/0283 |
| 2022/0166682 A1* | 5/2022 | Patrick | H04L 41/0654 |
| 2022/0292008 A1* | 9/2022 | Kavali | G06F 11/0766 |

* cited by examiner

*Primary Examiner* — Joseph D Manoskey
(74) *Attorney, Agent, or Firm* — Lowenstein Sandler LLP

(57) ABSTRACT

Apparatuses, systems, and techniques to predict a probability of an error or anomaly in processing units, such as those of a data center. In at least one embodiment, the probability of an error occurring in a processing unit is identified using multiple trained machine learning models, in which the trained machine learning models each outputs, for example, the probability of an error occurring within a different predetermined time period.

21 Claims, 15 Drawing Sheets

700 

Receive historical telemetry data for a plurality of devices that share a common device type. 710

Generate at least one feature based on the received telemetry data for the device to train a plurality of machine learning models used to generate a plurality of error predictions. 715

Train a plurality of machine learning models to generate error predictions for devices having the device type based on the historical telemetry data. 720

FIG. 7

```
Receive telemetry data indicative of at least one aspect of an operation of the device,
wherein the telemetry data comprises a first parameter and a second set of parameters.
910

Determine a first value of the first parameter from the telemetry data. 920

Estimate a second value for the first parameter based on inputting the values of the
second set of parameters into a function that relates the first parameter to the second set
of parameters. 930

Determine a difference between the first value and the second value. 940

Determine whether an anomaly is detected based at least in part on the difference
between the first value and the second value.
950
```

FIG. 9

AUTOMATIC ERROR PREDICTION IN DATA CENTERS

TECHNICAL FIELD

At least one embodiment pertains to training and use of machine learning models to predict errors in devices such as processing units of data centers.

BACKGROUND

Data centers can include a plurality of nodes, where each node may include, for example, one or more central processing units (CPUs) and/or one or more graphics processing units (GPUs). Typically, nodes of the data center may experience failures and/or errors that are caused by hardware, software, and/or user application related problems. Failure of one or more nodes of the data center may have rippling effects on other nodes of the data center, which may trigger errors and/or failures in additional nodes, in some instances causing failure in the data center. Failures in the data center may result in loss of resources, money, and/or data (e.g., workloads processed at the time of failure). Additionally, once an error has occurred, the nodes experiencing failures and/or errors are restarted or repaired, which increases the down time of the nodes of the data center and detrimentally affects performance of the data center.

BRIEF DESCRIPTION OF DRAWINGS

FIG. 7 is a flow diagram of training a plurality of machine learning models to predict a probability of an error occurring in a graphics processing unit of a data center within various predetermined time periods, according to at least one embodiment;

FIG. 9 is a flow diagram of identifying an anomaly in a graphics processing unit of a data center, according to at least one embodiment;

DETAILED DESCRIPTION

Described herein are methods, systems and apparatuses for predicting errors and/or failures of devices in a fleet of devices or collection of many devices. For example, the methods, systems, and apparatuses described herein may predict errors and/or failures of one or more devices (e.g., GPUs, DPUs, and/or CPUs) in a data center that may include hundreds or thousands of devices. Errors and/or failures may be predicted by collecting system level telemetry data and/or metrics collected from systems and/or drivers and processing system telemetry data and/or metrics using one or more trained machine learning models in embodiments. The detected errors and/or failures may include errors and/or failures indicative of a hardware problem, errors and/or failures indicative of a software problem and/or errors and/or failures indicative of a user application problem. Devices for which errors and/or failures are predicted may then be cycled offline, serviced (e.g., by performing preventative maintenance), updated, monitored, reallocated, etc. prior to an error or failure occurring. Such prediction of errors and/or failures and performance of preemptive actions before errors and/or failures occur within a datacenter can reduce data loss, increase up time and/or efficiency, and/or improve functionality of datacenters.

In one embodiment, processing logic receives telemetry data for a device (e.g., a node of a datacenter), wherein the telemetry data is indicative of at least one aspect of an operation of the device. Processing logic processes an input based on the telemetry data using a plurality of trained machine learning models to generate a plurality of error predictions. A first trained machine learning model may output a first error prediction comprising a first probability of an error occurring within a first future time period. A second trained machine learning model may output a second error prediction comprising a second probability of an error occurring within a second future time period. One or more additional trained machine learning models may additionally output additional error predictions comprising probabilities of an error occurring within other future time periods. Processing logic may then use the outputs of the multiple trained machine learning models to determine whether (and optionally when) to perform a preventative action on the device. Accordingly, processing logic may address a predicted future problem within an appropriate future timeframe based on when a future problem is predicted to occur. As a result, devices may be used as long as possible while still performing preventative maintenance and/or other actions with regards to those devices before errors occur. This can result in a maximal efficiency of device use within a datacenter.

Inference and Training Logic

Figure 1A:
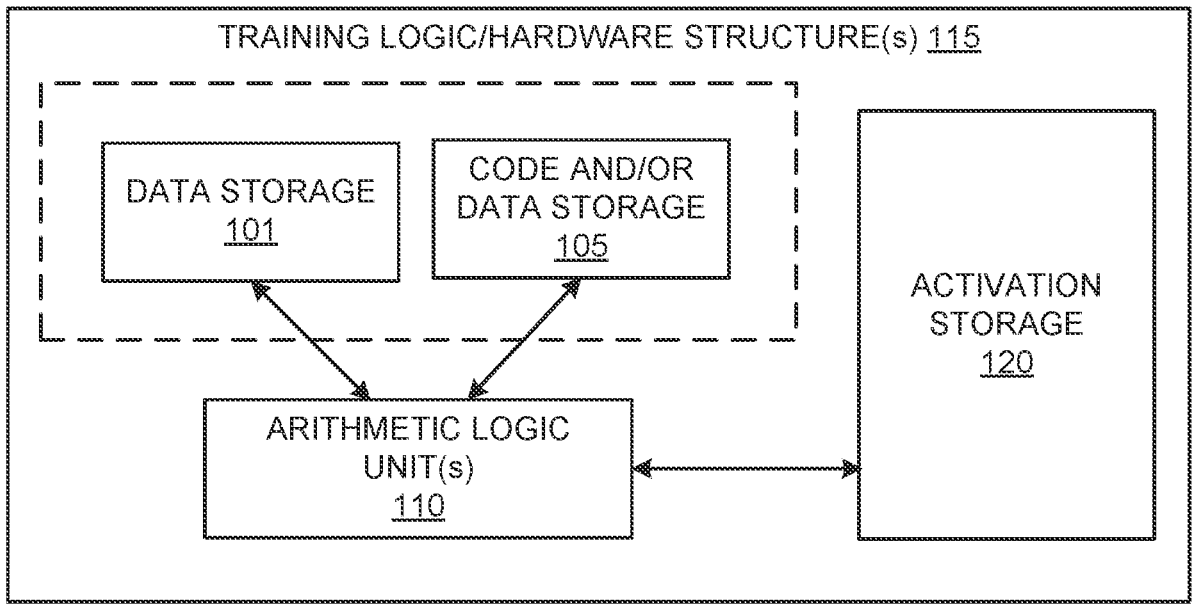
FIG. 1A illustrates inference and/or training logic, according to at least one embodiment.

In embodiments, multiple machine learning models are trained to predict errors and/or failures of devices (e.g., such as CPUs, DPUs, and/or GPUs in a datacenter). FIG. 1A illustrates inference and/or training logic 115 used to perform inferencing and/or training operations of such machine learning models in accordance with one or more embodiments. Details regarding inference and/or training logic 115 are provided below in conjunction with FIGS. 1A and/or 1B.

In at least one embodiment, inference and/or training logic 115 may include, without limitation, code and/or data storage 101 to store forward and/or output weight and/or input/output data, and/or other parameters to configure neurons or layers of a neural network trained and/or used for inferencing in aspects of one or more embodiments. In at least one embodiment, training logic 115 may include, or be coupled to code and/or data storage 101 to store graph code or other software to control timing and/or order, in which weight and/or other parameter information is to be loaded to configure logic, including integer and/or floating point units (collectively, arithmetic logic units (ALUs)). In at least one embodiment, code, such as graph code, loads weight or other parameter information into processor ALUs based on an architecture of a neural network to which such code corresponds. In at least one embodiment, code and/or data storage 101 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of code and/or data storage 101 may be included with other on-chip or off-chip data storage, including a processor's L1, L2, or L3 cache or system memory.

In at least one embodiment, any portion of code and/or data storage 101 may be internal or external to one or more processors or other hardware logic devices or circuits. In at least one embodiment, data storage 101 may be cache memory, dynamic randomly addressable memory ("DRAM"), static randomly addressable memory ("SRAM"), non-volatile memory (e.g., flash memory), or other storage. In at least one embodiment, a choice of whether data storage 101 is internal or external to a processor, for example, or comprising DRAM, SRAM, flash or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 115 may include, without limitation, a code and/or data storage 105 to store backward and/or output weight and/or input/output data corresponding to neurons or layers of a neural network trained and/or used for inferencing in aspects of one or more embodiments. In at least one embodiment, code and/or data storage 105 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, training logic 115 may include, or be coupled to, code and/or data storage 105 to store graph code or other software to control timing and/or order, in which weight and/or other parameter information is to be loaded to configure logic, including integer and/or floating point units (collectively, arithmetic logic units (ALUs).

In at least one embodiment, code, such as graph code, causes the loading of weight or other parameter information into processor ALUs based on an architecture of a neural network to which such code corresponds. In at least one embodiment, any portion of code and/or data storage 105 may be included with other on-chip or off-chip data storage, including a processor's L1, L2, or L3 cache or system memory. In at least one embodiment, any portion of code and/or data storage 105 may be internal or external to one or more processors or other hardware logic devices or circuits. In at least one embodiment, code and/or data storage 105 may be cache memory, DRAM, SRAM, non-volatile memory (e.g., flash memory), or other storage. In at least one embodiment, a choice of whether code and/or data storage 105 is internal or external to a processor, for example, or comprising DRAM, SRAM, flash memory or some other storage type may depend on available storage on-chip versus off-chip, latency requirements of training and/or inferencing functions being performed, batch size of data used in inferencing and/or training of a neural network, or some combination of these factors.

In at least one embodiment, code and/or data storage 101 and code and/or data storage 105 may be separate storage structures. In at least one embodiment, code and/or data storage 101 and code and/or data storage 105 may be a combined storage structure. In at least one embodiment, code and/or data storage 101 and code and/or data storage 105 may be partially combined and partially separate. In at least one embodiment, any portion of code and/or data storage 101 and code and/or data storage 105 may be included with other on-chip or off-chip data storage, including a processor's L1, L2, or L3 cache or system memory.

In at least one embodiment, inference and/or training logic 115 may include, without limitation, one or more arithmetic logic unit(s) ("ALU(s)") 110, including integer and/or floating point units, to perform logical and/or mathematical operations based, at least in part on, or indicated by, training and/or inference code (e.g., graph code), a result of which may produce activations (e.g., output values from layers or neurons within a neural network) stored in an activation storage 120 that are functions of input/output and/or weight parameter data stored in code and/or data storage 101 and/or code and/or data storage 105. In at least one embodiment, activations stored in activation storage 120 are generated according to linear algebraic and or matrix-based mathematics performed by ALU(s) 110 in response to performing instructions or other code, wherein weight values stored in code and/or data storage 105 and/or data storage 101 are used as operands along with other values, such as bias values, gradient information, momentum values, or other parameters or hyperparameters, any or all of which may be stored in code and/or data storage 105 or code and/or data storage 101 or another storage on or off-chip.

In at least one embodiment, ALU(s) 110 are included within one or more processors or other hardware logic devices or circuits, whereas in another embodiment, ALU(s) 110 may be external to a processor or other hardware logic device or circuit that uses them (e.g., a co-processor). In at least one embodiment, ALUs 110 may be included within a processor's execution units or otherwise within a bank of ALUs accessible by a processor's execution units either within same processor or distributed between different processors of different types (e.g., central processing units, graphics processing units, fixed function units, etc.). In at least one embodiment, code and/or data storage 101, code and/or data storage 105, and activation storage 120 may share a processor or other hardware logic device or circuit, whereas in another embodiment, they may be in different processors or other hardware logic devices or circuits, or some combination of same and different processors or other hardware logic devices or circuits. In at least one embodiment, any portion of activation storage 120 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 120 may be cache memory, DRAM, SRAM, non-volatile memory (e.g., flash memory), or other storage. In at least one embodiment, activation storage 120 may be completely or partially within or external to one or more processors or other logical circuits. In at least one embodiment, a choice of whether activation storage 120 is internal or external to a processor, for example, or comprising DRAM, SRAM, flash memory or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 115 illustrated in FIG. 1A may be used in conjunction with an application-specific integrated circuit ("ASIC"), such as a TensorFlow® Processing Unit from Google, an inference processing unit (IPU) from Graphcore™, or a Nervana® (e.g., "Lake Crest") processor from Intel Corp. In at least one embodiment, inference and/or training logic 115 illustrated in FIG. 1A may be used in conjunction with central processing unit ("CPU") hardware, data processing unit ("DPU") hardware, graphics processing unit ("GPU") hardware or other hardware, such as field programmable gate arrays ("FPGAs").

Figure 1B:
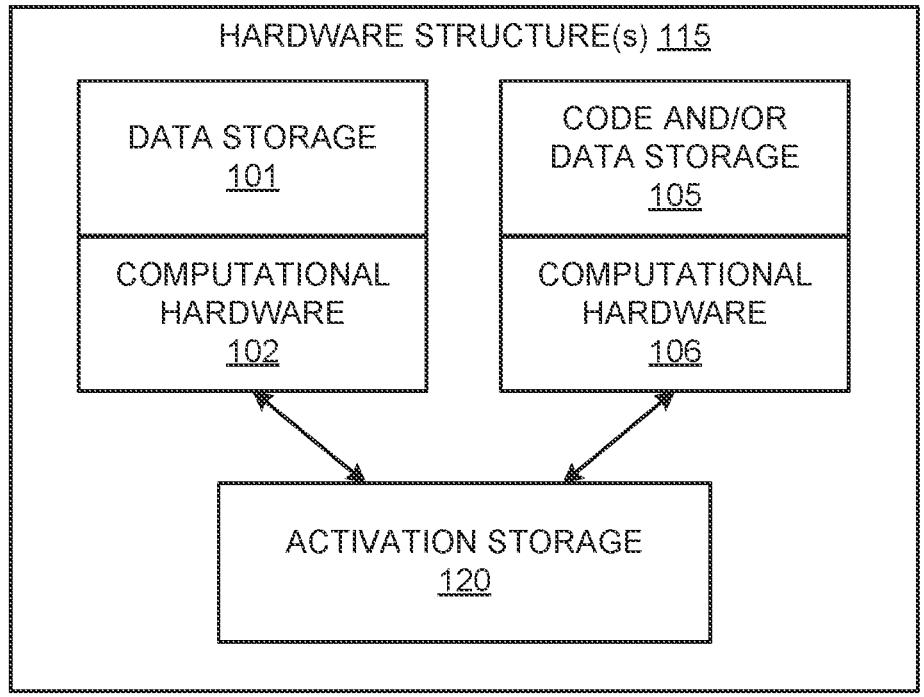
FIG. 1B illustrates inference and/or training logic, according to at least one embodiment.

FIG. 1B illustrates inference and/or training logic 115, according to at least one embodiment. In at least one embodiment, inference and/or training logic 115 may include, without limitation, hardware logic in which computational resources are dedicated or otherwise exclusively used in conjunction with weight values or other information corresponding to one or more layers of neurons within a neural network. In at least one embodiment, inference and/or training logic 115 illustrated in FIG. 1B may be used in conjunction with an application-specific integrated circuit (ASIC), such as TensorFlow® Processing Unit from Google, an inference processing unit (IPU) from Graphcore™, or a Nervana® (e.g., "Lake Crest") processor from Intel Corp. In at least one embodiment, inference and/or training logic 115 illustrated in FIG. 1B may be used in conjunction with central processing unit (CPU) hardware, graphics processing unit (GPU) hardware, data processing unit ("DPU") hardware, or other hardware, such as field programmable gate arrays (FPGAs). In at least one embodiment, inference and/or training logic 115 includes, without limitation, code and/or data storage 101 and code and/or data storage 105, which may be used to store code (e.g., graph code), weight values and/or other information, including bias values, gradient information, momentum values, and/or other parameter or hyperparameter information. In at least one embodiment illustrated in FIG. 1B, each of code and/or data storage 101 and code and/or data storage 105 is associated with a dedicated computational resource, such as computational hardware 102 and computational hardware 106, respectively. In at least one embodiment, each of computational hardware 102 and computational hardware 106 comprises one or more ALUs that perform mathematical functions, such as linear algebraic functions, only on information stored in code and/or data storage 101 and code and/or data storage 105, respectively, result of which is stored in activation storage 120.

In at least one embodiment, each of code and/or data storage 101 and 105 and corresponding computational hardware 102 and 106, respectively, correspond to different layers of a neural network, such that resulting activation from one storage/computational pair 101/102 of code and/or data storage 101 and computational hardware 102 is provided as an input to a next storage/computational pair 105/106 of code and/or data storage 105 and computational hardware 106, in order to mirror a conceptual organization of a neural network. In at least one embodiment, each of storage/computational pairs 101/102 and 105/106 may correspond to more than one neural network layer. In at least one embodiment, additional storage/computation pairs (not shown) subsequent to or in parallel with storage/computation pairs 101/102 and 105/106 may be included in inference and/or training logic 115.

Neural Network Training and Deployment

Figure 2:
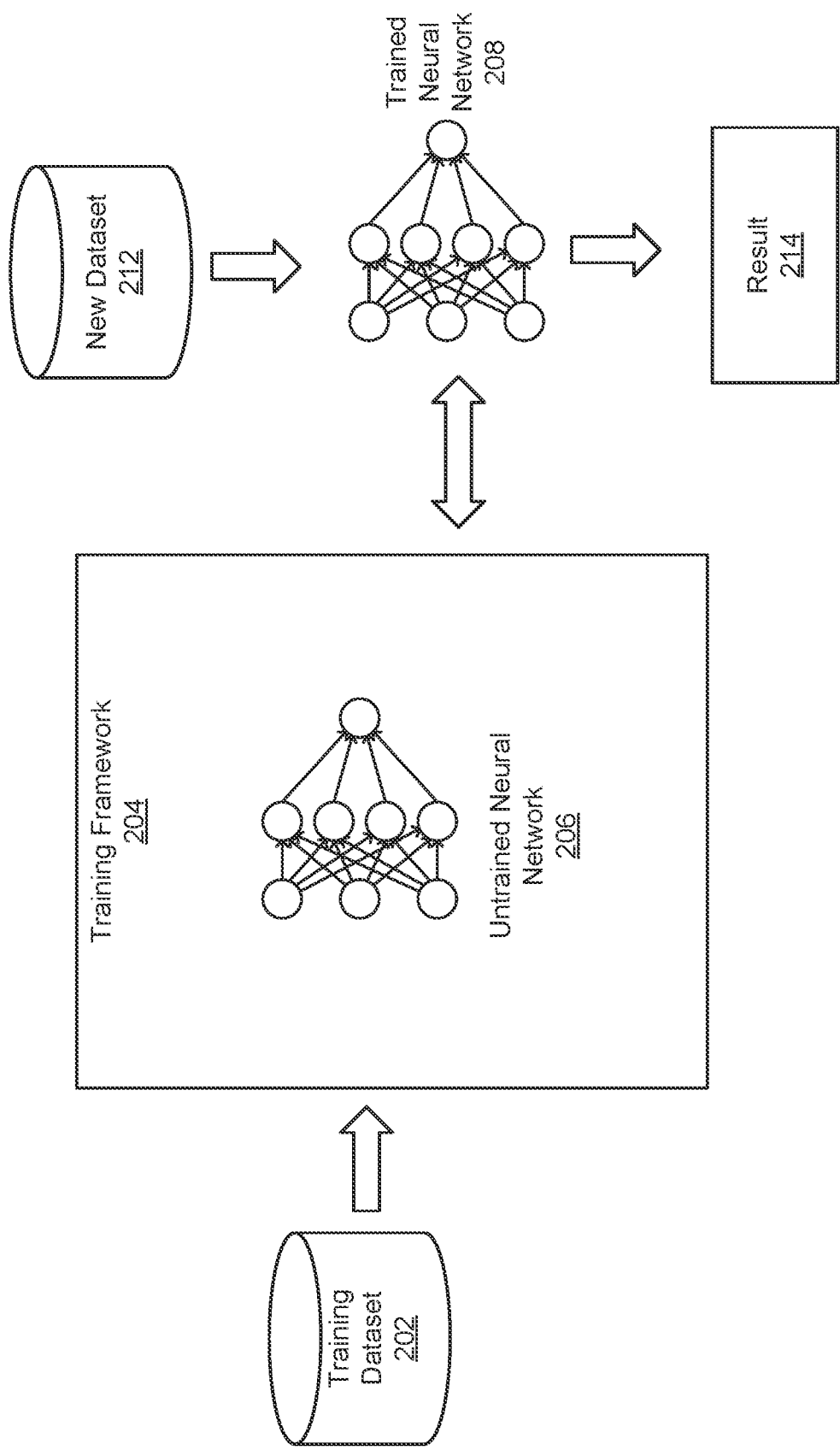
FIG. 2 illustrates training and deployment of a neural network, according to at least one embodiment.

FIG. 2 illustrates training and deployment of a deep neural network, according to at least one embodiment. In at least one embodiment, untrained neural network 206 is trained using a training dataset 202. In at least one embodiment, training framework 204 is a PyTorch framework, whereas in other embodiments, training framework 204 is a TensorFlow, Boost, Caffe, Microsoft Cognitive Toolkit/CNTK, MXNet, Chainer, Keras, Deeplearning4j, or other training framework. In at least one embodiment, training framework 204 trains an untrained neural network 206 and enables it to be trained using processing resources described herein to generate a trained neural network 208. In at least one embodiment, weights may be chosen randomly or by pre-training using a deep belief network. In at least one embodiment, training may be performed in either a supervised, partially supervised, or unsupervised manner.

In at least one embodiment, untrained neural network 206 is trained using supervised learning, wherein training dataset 202 includes an input paired with a desired output for an input, or where training dataset 202 includes input having a known output and an output of neural network 206 is manually graded. In at least one embodiment, untrained neural network 206 is trained in a supervised manner and processes inputs from training dataset 202 and compares resulting outputs against a set of expected or desired outputs. In at least one embodiment, errors are then propagated back through untrained neural network 206 (e.g., via gradient descent). In at least one embodiment, training framework 204 adjusts weights that control untrained neural network 206. In at least one embodiment, training framework 204 includes tools to monitor how well untrained neural network 206 is converging towards a model, such as trained neural network 208, suitable to generating correct answers, such as in result 214, based on input data such as a new dataset 212. In at least one embodiment, training framework 204 trains untrained neural network 206 repeatedly while adjusting weights to refine an output of untrained neural network 206 using a loss function and adjustment algorithm, such as stochastic gradient descent. In at least one embodiment, training framework 204 trains untrained neural network 206 until untrained neural network 206 achieves a desired accuracy. In at least one embodiment, trained neural network 208 can then be deployed to implement any number of machine learning operations.

In at least one embodiment, untrained neural network 206 is trained using unsupervised learning, wherein untrained neural network 206 attempts to train itself using unlabeled data. In at least one embodiment, unsupervised learning training dataset 202 will include input data without any associated output data or "ground truth" data. In at least one embodiment, untrained neural network 206 can learn groupings within training dataset 202 and can determine how individual inputs are related to untrained dataset 202. In at least one embodiment, unsupervised training can be used to generate a self-organizing map in trained neural network 208 capable of performing operations useful in reducing dimensionality of new dataset 212. In at least one embodiment, unsupervised training can also be used to perform anomaly detection, which allows identification of data points in new dataset 212 that deviate from normal patterns of new dataset 212.

In at least one embodiment, semi-supervised learning may be used, which is a technique in which in training dataset 202 includes a mix of labeled and unlabeled data. In at least one embodiment, training framework 204 may be used to perform incremental learning, such as through transferred learning techniques. In at least one embodiment, incremental learning enables trained neural network 208 to adapt to new dataset 212 without forgetting knowledge instilled within trained neural network 208 during initial training.

Data Center

Figure 3:
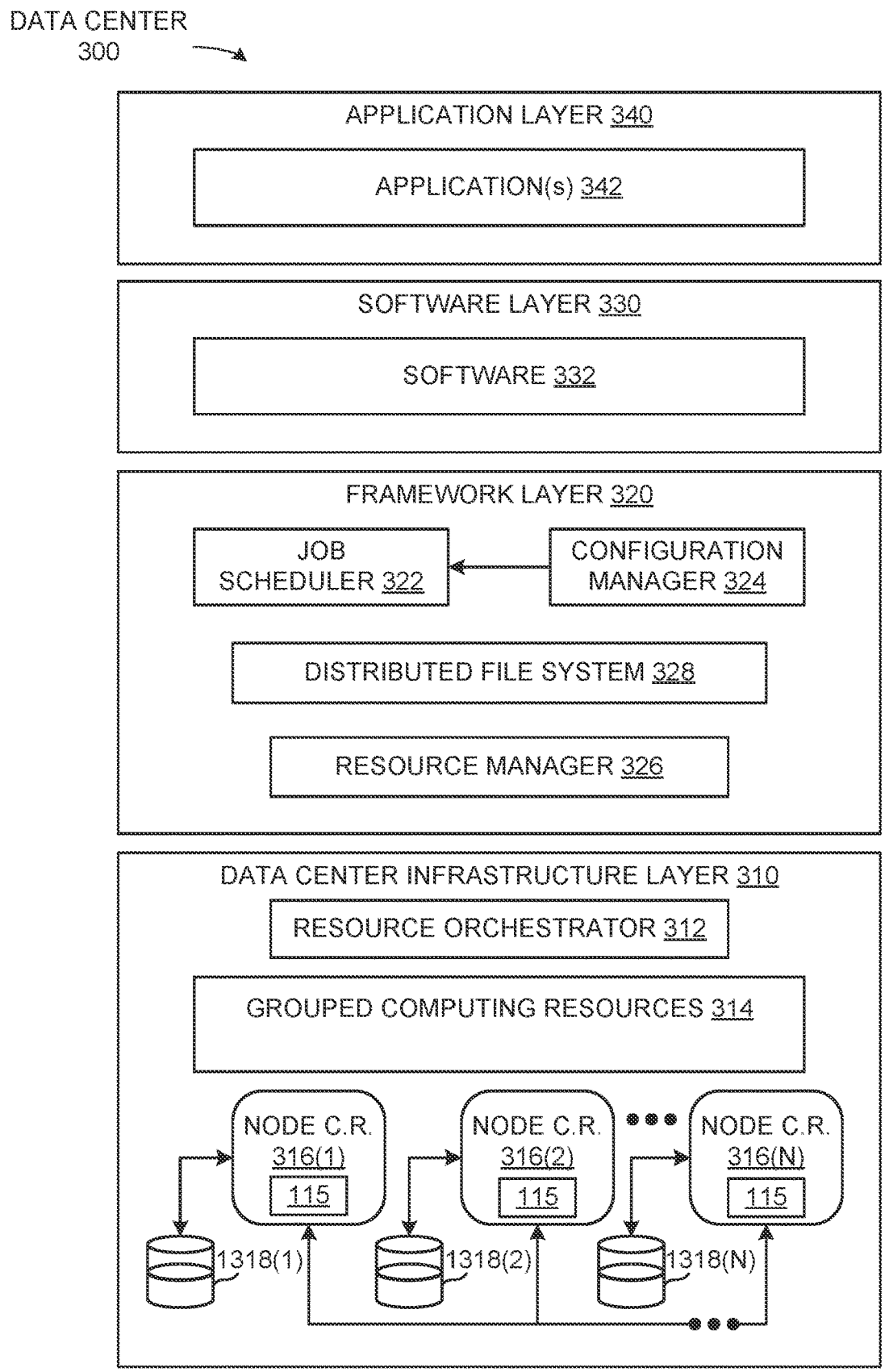
FIG. 3 illustrates an example data center, according to at least one embodiment.

FIG. 3 illustrates an example data center 300, in which at least one embodiment may be used. In at least one embodiment, data center 300 includes a data center infrastructure layer 310, a framework layer 320, a software layer 330 and an application layer 340.

In at least one embodiment, as shown in FIG. 3, data center infrastructure layer 310 may include a resource orchestrator 312, grouped computing resources 314, and node computing resources ("node C.R.s") 316(1)-316(N), where "N" represents a positive integer (which may be a different integer "N" than used in other figures). In at least one embodiment, node C.R.s 316(1)-316(N) may include, but are not limited to, any number of central processing units ("CPUs") or other processors (including accelerators, data processing units, field programmable gate arrays (FPGAs), graphics processors, etc.), memory storage devices 318(1)-318(N) (e.g., dynamic read-only memory, solid state storage or disk drives), network input/output ("NW I/O") devices, network switches, virtual machines ("VMs"), power modules, and cooling modules, etc. In at least one embodiment, one or more node C.R.s from among node C.R.s 316(1)-316(N) may be a server having one or more of above-mentioned computing resources.

In at least one embodiment, grouped computing resources 314 may include separate groupings of node C.R.s housed within one or more racks (not shown), or many racks housed in data centers at various geographical locations (also not shown). In at least one embodiment, separate groupings of node C.R.s within grouped computing resources 314 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 312 may configure or otherwise control one or more node C.R.s 316(1)-316(N) and/or grouped computing resources 314. In at least one embodiment, resource orchestrator 312 may include a software design infrastructure ("SDI") management entity for data center 300. In at least one embodiment, resource orchestrator 112 may include hardware, software or some combination thereof.

In at least one embodiment, as shown in FIG. 3, framework layer 320 includes a job scheduler 322, a configuration manager 324, a resource manager 326 and a distributed file system 328. In at least one embodiment, framework layer 320 may include a framework to support software 332 of software layer 330 and/or one or more application(s) 342 of application layer 340. In at least one embodiment, software 332 or application(s) 342 may respectively include web-based service software or applications, such as those provided by Amazon Web Services, Google Cloud and Microsoft Azure. In at least one embodiment, framework layer 320 may be, but is not limited to, a type of free and open-source software web application framework such as Apache Spark™ (hereinafter "Spark") that may utilize distributed file system 328 for large-scale data processing (e.g., "big data"). In at least one embodiment, job scheduler 332 may include a Spark driver to facilitate scheduling of workloads supported by various layers of data center 300. In at least one embodiment, configuration manager 324 may be capable of configuring different layers such as software layer 330 and framework layer 320 including Spark and distributed file system 328 for supporting large-scale data processing. In at least one embodiment, resource manager 326 may be capable of managing clustered or grouped computing resources mapped to or allocated for support of distributed file system 328 and job scheduler 322. In at least one embodiment, clustered or grouped computing resources may include grouped computing resources 314 at data center infrastructure layer 310. In at least one embodiment, resource manager 326 may coordinate with resource orchestrator 312 to manage these mapped or allocated computing resources.

In at least one embodiment, software 332 included in software layer 330 may include software used by at least portions of node C.R.s 316(1)-316(N), grouped computing resources 314, and/or distributed file system 328 of framework layer 320. In at least one embodiment, one or more types of software may include, but are not limited to, Internet web page search software, e-mail virus scan software, database software, and streaming video content software.

In at least one embodiment, application(s) 342 included in application layer 340 may include one or more types of applications used by at least portions of node C.R.s 316(1)-316(N), grouped computing resources 314, and/or distributed file system 328 of framework layer 320. In at least one embodiment, one or more types of applications may include, but are not limited to, any number of a genomics application, a cognitive compute, application and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 324, resource manager 326, and resource orchestrator 312 may implement any number and type of self-modifying actions based on any amount and type of data acquired in any technically feasible fashion. In at least one embodiment, self-modifying actions may relieve a data center operator of data center 300 from making possibly bad configuration decisions and possibly avoiding underutilized and/or poor performing portions of a data center.

In at least one embodiment, data center 300 may include tools, services, software or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 300. In at least one embodiment, trained machine learning models corresponding to one or more neural networks may be used to infer or predict information using resources described above with respect to data center 300 by using weight parameters calculated through one or more training techniques described herein.

In at least one embodiment, data center may use CPUs, application-specific integrated circuits (ASICs), GPUs, DPUs, FPGAs, or other hardware to perform training and/or inferencing using above-described resources. Moreover, one or more software and/or hardware resources described above may be configured as a service to allow users to train or performing inferencing of information, such as error and/or failure prediction services.

Each of the nodes C.R. 316(1)-316(N) of data center 300 may generate a periodic or continuous stream of telemetry data during operation. The telemetry data may be or include a collection of measurements and/or other data that is automatically generated by or for nodes C.R. 316(1)-316 (N). Telemetry data may include, for example, power usage, system clock value, GPU, DPU, or CPU temperature value, memory temperature value, GPU, DPU, or CPU utilization, memory utilization, frame buffer utilization, and/or other data. Inference and/or training logic 115 of FIGS. 1A-B may be used to train and/or implement one or more machine learning models to monitor a health of one or more devices (e.g., nodes) of data center 300 and/or to predict errors and/or failures of the devices (e.g., nodes) based on processing the telemetry data, as discussed in greater detail below.

Node Error Detection

Embodiments described herein relate to systems and methods for predicting (e.g., forecasting) failures, faults, and/or errors (e.g., collectively "errors") in a graphics processing unit (GPU), CPU, DPU, or other device (e.g., node) of a data center (e.g., similar to data center 300 of FIG. 3) before such errors occur. In embodiments, telemetry of the GPUs, DPUs, CPUs and/or other devices of the data center is used to train a plurality of machine learning models to predict errors in the GPUs, DPUs, CPUs and/or other devices of the data center. In embodiments, telemetry of GPUs, DPUs, CPUs and/or other devices of the data center includes, for example, power usage; a temperature of GPU, DPU, or CPU; a temperature of memory of the GPU, DPU, or CPU; GPU, DPU, or CPU utilization, etc. In embodiments, multiple machine learning models are trained and used, where each machine learning model is trained to predict the occurrence of errors in the GPUs, DPUs, CPUs and/or other devices of the data center within a different predetermined future timeframe (e.g., 1 hour, 2 hours, 3 hours, 24 hours, etc. into the future). Depending on the embodiment, the plurality of machine learning models may be further trained to predict a specific type of error that might occur in a GPU, CPU, DPU and/or other device of the data center at some predetermined time period in advance.

In embodiments, machine learning models may additionally or alternatively be trained to detect anomalies in GPUs, DPUs, CPUs and/or other devices. In embodiments, the machine learning model determines correlations between telemetry data and/or features (e.g., between different types of telemetry data) of the GPU, CPU, DPU or other device and generates an equation to determine an expected value of the telemetry data. An expected value of first telemetry data may be calculated based on inputting other received telemetry data of the GPU, CPU, DPU or other device into the algorithm. Whether the GPU, CPU, DPU or other device is operating as expected may be determined based on whether the actual value of the first telemetry data matches the estimated value of the first telemetry data as output by the algorithm. For example, a GPU may output telemetry data including a GPU power usage, a system clock value, a GPU temperature value, a memory temperature value, a GPU utilization value, and a memory utilization value. An algorithm may be generated where power usage is a function of system clock value, GPU temperature value, memory temperature value, GPU utilization value, and memory utilization value. At any given time, the power usage value output by the algorithm is expected to correspond closely to the actual measured power usage. If these values are different, then an anomaly may be detected. Similar functions may be generated for one or more other types of telemetry data, as set forth in greater detail below.

Once a determination on whether the GPU, CPU, DPU or other device is operating as expected or not, (e.g., an identification of an anomaly is made and/or an error or failure is predicted) a notification may be provided to assist in preventive maintenance on the GPU, CPU, DPU or other device. Depending on the embodiment, the notification can include an indication of the type of error, a point in time when the error is likely to occur, and the probability of the error to occur are provided. Additionally, or alternatively, actions may be automatically performed based on detected anomalies and/or predicted errors and/or failures. Examples of such actions include power cycling a device, powering down a device, scheduling a device for maintenance, changing a workload of a device (e.g., reducing a workload of the device, adjusting the workload of the device so that the device performs non-critical or non-sensitive tasks, etc.), and so on. Which action or actions to perform and when to perform the action may be determined based on the outputs of one or more trained machine learning models in embodiments.

Aspects of the present disclosure address the above and other deficiencies by using machine learning to provide a probability of an error, in some embodiments a probability of a specific error, to occur in at least one GPU, CPU, DPU or other device of a data center or other system that includes many devices within multiple predetermined time periods.

Advantages of the present disclosure include, but are not limited to, providing predictions of a probability of an error to occur in GPUs, DPUs, CPUs and/or other devices of a data center or other system to allow for preventative actions instead of remedial actions, thereby increasing the reliability of the GPUs, DPUs, CPUs, other devices, etc. of the data center or other system by reducing downtime due to unplanned restarts and/or repairs of the devices.

Some embodiments are discussed herein with reference to predicting errors in GPUs of the data center. However, it should be understood that the embodiments described herein with regards to GPUs also apply to other types of processing units (e.g., such as CPUs or DPUs) and other devices, which may or may not render graphics for display. Examples of other types of processing units to which embodiment may apply include central processing units (CPUs), data processing units (DPUs), field programmable gate arrays (FPGAs), processors, accelerators, and/or other components that perform operations on some external data source. Additionally, embodiments described herein with regards to data centers apply to the GPUs, DPUs, CPUs and/or other devices not implemented into data centers, such GPUs, DPUs, CPUs, and/or other devices that are included in other systems and/or that are used as individual devices that are not part of a large grouping of devices (e.g., in laptop computers, desktop computers, tablet computers, mobile phones and/or other devices).

Figure 4A:
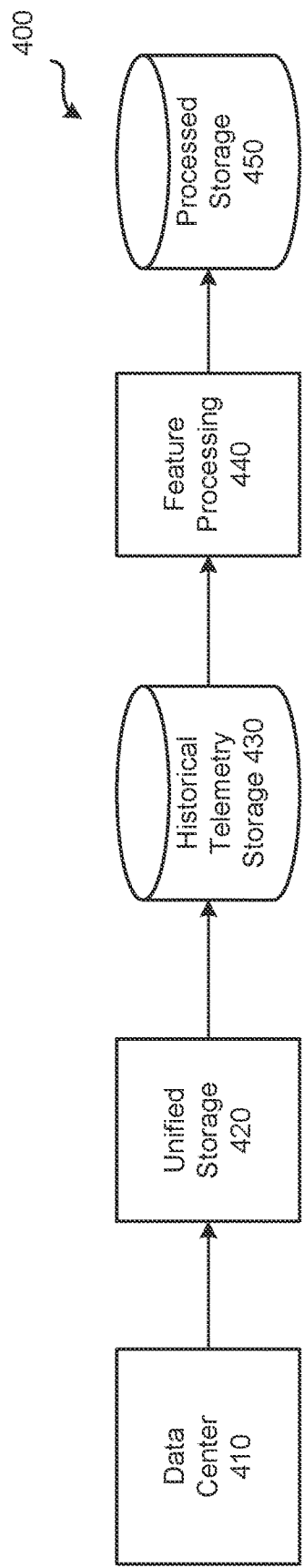
FIG. 4A illustrates generating features for training of one or more machine learning models based on telemetry of one or more graphics processing unit (GPUs) of the data center, according to at least one embodiment.

FIG. 4A illustrates a system 400 for generating features for the training of one or more machine learning models based on telemetry of one or more graphics processing units (GPUs), DPUs, CPUs and/or other devices of a data center, according to at least one embodiment. In at least one embodiment, system 400 includes a data center 410, a unified storage 420, a historical telemetry storage 430, a feature processor 440, and a processed storage 440.

Data center 410, similar to data center 300 of FIG. 3, contains a plurality of node computing resources (e.g., GPUs, DPUs, CPUs, etc.), in which each GPU, CPU, DPU, etc. generates telemetry data. Telemetry data may be a plurality of operational metrics including streams of values at corresponding time periods that indicate a metric associated with an aspect of the operation of the GPU, CPU, DPU or other device. Examples of metrics include errors; power usage; system clock; frame buffer utilization; GPU, DPU, or CPU temperature; DPU, GPU, or CPU memory temperature; DPU, GPU or CPU utilization rate; DPU, GPU or CPU memory utilization; and so on. The telemetry data of each GPU, CPU, DPU or other device of the data center 410 may be stored in a unified storage 420.

Unified storage 420 may be physical memory and may include volatile memory devices (e.g., random access memory (RAM)), non-volatile memory devices (e.g., flash memory, NVRAM), and/or other types of memory devices. In another example, unified storage 420 may include one or more mass storage devices, such as hard drives, solid-state drives (SSD)), other data storage devices, or a combination thereof. In yet another example, unified storage 420 may be any virtual memory, logical memory, other portion of memory, or a combination thereof for storing, organizing, or accessing data. In a further example, unified storage 420 may include a combination of one or more memory devices, one or more mass storage devices, virtual memory, other data storage devices, or a combination thereof, which may or may not be arranged in a cache hierarchy with multiple levels. Depending on the embodiment, the unified storage 420 may be a part of the data center (e.g., local storage) or a networked storage device (e.g., remote). Depending on the embodiment, the telemetry data of each GPU, CPU, DPU and/or other device of the data center 410 may be stored in their respective memory storage devices (e.g., memory storage devices 318(1)-318(N) of FIG. 3) prior to being stored in the unified storage 420. In some embodiments, rather than storing the telemetry data of each device of the data center 410, the telemetry data may be accessed from their respective memory storage devices.

Historical telemetry storage 430 collects an aggregate of telemetry data generated for each GPU, CPU, DPU and/or other device of the data center 410. The historical telemetry storage 430 receives the telemetry data of each GPU, CPU, DPU and/or other device of the data center 410 every predetermined time period (e.g., every 30 seconds), which may be aggregated to the previously collected telemetry data generated for each GPU, CPU, DPU, and/or other device of the data center 410. As the historical telemetry storage 430 receives the telemetry data, the historical telemetry storage 430 may determine a specific duration of time in which to aggregate specific types of telemetry data. The specific types of telemetry data may be aggregated according to their respective characteristics to provide more accurate metrics regarding the actual value(s) of the specific types of telemetry data. For example, some specific types of telemetry data may be aggregated over a 24 hour time period as compared to other types of telemetry data that are aggregated over a 1 hour time period. Once the historical telemetry storage 420 has received an appropriate aggregation of each specific type of telemetry data according to their respective characteristics, the aggregated telemetry data is sent to a feature processing module 430 to generate at least one feature. The at least one feature may be based on the aggregated telemetry data, and may be used for training or inference of a machine learning model (e.g., model 470A-D of FIG. 4B), such as to predict errors in a GPU, CPU, DPU or other device of the data center 410.

In some embodiments, the at least one feature may be based on aggregated telemetry data (e.g., aggregated historical telemetry data) of one or multiple GPUs, DPUs, CPUs and/or other devices of the same type of the data center 410 that did not have an error (e.g., healthy GPUs) within a window such as a moving window (e.g., within the 24 hours prior to a current time). Accordingly, in one instance, the feature processing module 440 may generate a feature according to a mean of aggregated telemetry data of the healthy GPUs of the data center 410 over a time period (e.g., mean GPU temperature, mean GPU utilization, mean memory temperature, mean memory utilization, and so on). In another instance, the feature processing module 440 may generate a feature according to a standard deviation of aggregated telemetry data of a GPU of the data center 410 over a time period based on a group of healthy GPUs of the data center 410 (e.g., standard deviation of GPU utilization for the GPU from a mean of GPU utilization for the healthy GPUs, standard deviation of GPU temperature for the GPU from a mean of GPU temperature for the healthy GPUs, standard deviation of memory temperature for the GPU from a mean of memory temperature for the healthy GPUs, standard deviation of memory utilization for the GPU from a mean of memory utilization for the healthy GPUs, and so on). In another instance, the feature processing module 440 may generate a feature according to a z-score of aggregated telemetry data of a GPU over a time period. In another instance, the feature processing module 440 may generate a feature according to a z-score of aggregated telemetry data of a GPU of the data center 410 based on a group of healthy GPUs of the data center 410 for a time period. Z-score may be a numerical measurement that describes a value's relationship to the mean of a group of values. For example, a z-score of GPU utilization for the GPU from a mean of GPU utilization for the healthy GPUs. In yet another instance, the feature processing module 440 may generate a feature according to a minimum value and/or maximum value of the aggregated telemetry data of healthy GPUs of the data center 410 within a time period. Some or all of these features may be generated.

In some embodiments, one or more features may be generated according to aggregated telemetry data of the individual GPUs of the data center 410 within a moving window (e.g., within 24 hours prior to a current time, within 12 hours prior to a current time, within 1 week prior to a current time, etc.). Accordingly, in one instance, the feature processing module 440 may generate one or more feature according to a standard deviation of aggregated telemetry data of the individual GPU of the data center 410 within a moving window. For example, standard deviations of one or more types of data from the GPU's aggregated telemetry data (e.g., GPU utilization) may be determined for the time period within the moving window. In another instance, the feature processing module 440 may generate one or more feature according to a z-score of aggregated telemetry data of the individual GPU within the moving window. For example, a z-score of aggregated telemetry data of the GPU may be determined for one or more types of telemetry data within the moving window. In another instance, the feature processing module 440 may generate a feature according to a moving average (or moving mean) of the aggregated telemetry data of the individual GPU over a moving window. In another instance, the feature processing module 440 may generate a feature according to a moving standard deviation of the aggregated telemetry data of the individual GPU. Some or all of these features may be generated, in additional to or instead of one or more features generated from data of multiple devices (e.g., of healthy GPUs).

Features output by feature processing module 430 may be weighted in embodiments. In some embodiments, the feature processing module 440 may apply a weight to each predetermined time interval (e.g., 1, 3, 4, 6 hours) within a moving window (e.g., a time interval of the 24 hours prior to the current time). In some embodiments, feature processing module 440 applies weights to telemetry data based on age of the data. Accordingly, data received more recently may be weighted more heavily than data received less recently. For example, for moving average and standard deviation based on historical data of an individual GPU of the data center 410, a weight may be applied to the telemetry data associated with the last hour prior to the current time that is higher than a weight applied to telemetry data associated with data received earlier than within the last hour.

Depending on the embodiment, the feature processing module 440 may generate features according to a comparison of the historical telemetry data of GPUs, CPUs, or DPUs of the data center 410, the aggregated recent telemetry data of GPUs of the data center 410, and/or live or current telemetry data of GPUs, CPUs, or DPUs of the data center 410 with an expected set of telemetry data (e.g., as determined from a predetermined GPU, CPU, or DPU or manufacturer tested GPU CPU, or DPU of similar type and application). Depending on the embodiment, when generating the features, the feature processing module 440 may incorporate telemetry data and metadata associated with other various components of data center 410 such as storage devices, network interfaces, and other components associated with the GPUs, CPUs, or DPUs of the data center 410.

In some embodiments, the at least one feature for a device (e.g., GPU) may be associated with an error and may be generated according to historical data of the device of the data center 410 within a predetermined time period or window (e.g., 24 hours) prior to the error occurring. In some embodiments, the feature processing module 440 generates features by assigning labels to each time step (e.g., each hour) of the historical data of an individual device within the predetermined time period (e.g., 24 hours) prior to the error occurring on the device. For each device, a non-zero label may be assigned to each time step containing telemetry data corresponding to an error and a zero label may be assigned to each time step containing telemetry data corresponding to a non-error. Any and all of the aforementioned features may be generated together in embodiments.

Once the feature processing module 440 generates a plurality of features associated with the aggregated telemetry data of the GPUs of the data center 410, the plurality of features is stored in processed storage 450. Processed storage 450 may be physical memory and may include volatile memory devices (e.g., random access memory (RAM)), non-volatile memory devices (e.g., flash memory, NVRAM), and/or other types of memory devices. In another example, processed storage 450 may include one or more mass storage devices, such as hard drives, solid-state drives (SSD)), other data storage devices, or a combination thereof. In yet another example, processed storage 450 may be any virtual memory, logical memory, other portion of memory, or a combination thereof for storing, organizing, or accessing data. In a further example, processed storage 450 may include a combination of one or more memory devices, one or more mass storage devices, virtual memory, other data storage devices, or a combination thereof, which may or may not be arranged in a cache hierarchy with multiple levels. Depending on the embodiment, the processed storage 450 may be a part of the data center (e.g., local storage) or a networked storage device (e.g., remote).

Figure 4B:
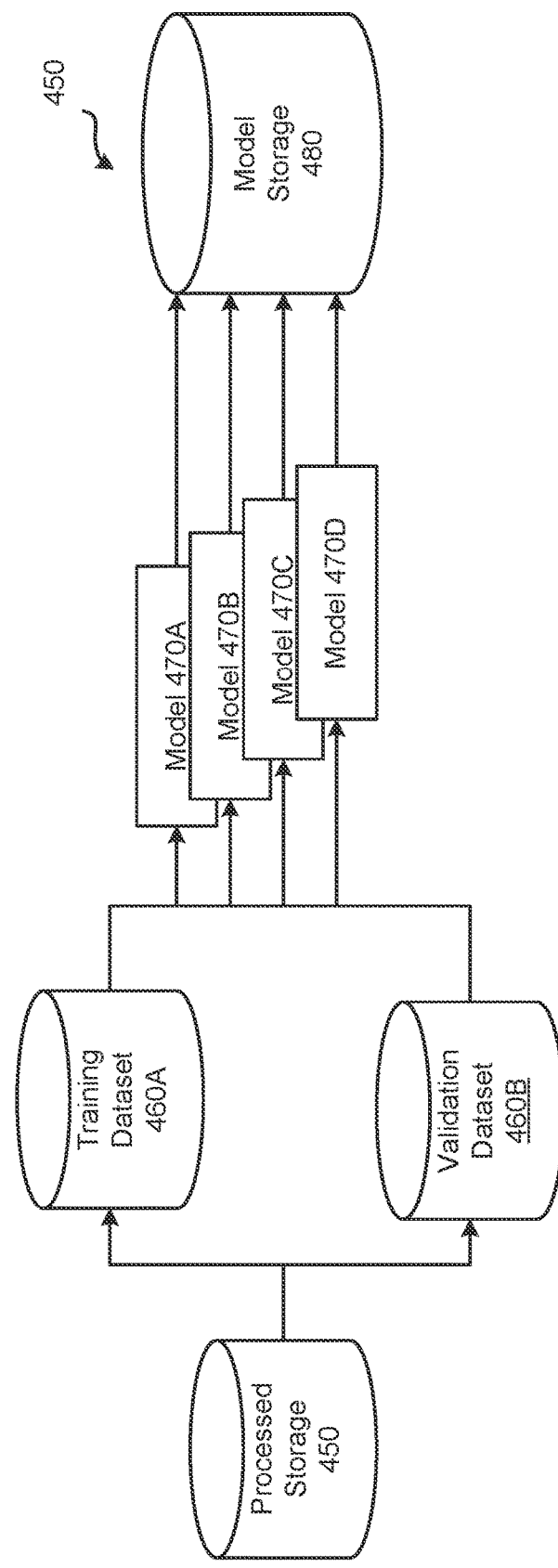
FIG. 4B illustrates training one or more machine learning models to predict a probability of an error occurring in a GPU of the data center within various predetermined time periods based on the generated features of FIG. 4A, according to at least one embodiment.

FIG. 4B illustrates system 450 configured for training one or more machine learning models to predict a probability of an error occurring in a GPU, CPU, DPU or other device of the data center 410 of FIG. 4A within various predetermined time periods based on the generated features stored in the processed storage 450. In at least one embodiment, historical telemetry data and/or generated features may be divided into one or more training dataset 460A and one or more validation dataset 460B. These datasets 460A-B may be used to train and validate a plurality of machine learning models 470A-D (e.g., models), which may be stored in model storage 480.

As noted above, processed storage 450 contains a plurality of features associated with the aggregated telemetry data of the GPUs, CPUs, DPUs, and/or other devices of the data center 410. The processed storage 450 may include, for example, data from one or more output error log (e.g., error logs of multiple GPUs) that specifies when errors occurred and/or the nature of the errors. Errors associated with the GPUs, CPUs, DPUs, and/or other devices of the data center 410 may include, for example, processing stopped, memory page fault, video processor exception, double bit error correction code (ECC) error, preemptive cleanup, due to previous error, or any other error associated with the hardware, software, and/or user application. In some embodiments, the predetermined errors associated with the GPUs of the data center 410 may include a corresponding error code represented alphabetically, numerically, and/or alphanumerically.

The processed storage 450 may additionally include telemetry data (e.g., that preceded error states and/or non-error states) and/or generated features (e.g., that preceded error states and/or non-error states). This data may be used to train multiple machine learning models 470A-D. In some embodiments, the telemetry data and/or features generated from the telemetry data is just a fraction of the available telemetry data, and includes those features and/or telemetry data that most strongly correlates to errors. In one embodiment, the telemetry data and/or features are for power usage, system clock, device temperature, on-device memory temperature, device utilization, on-device memory utilization, frame buffer utilization, and so on.

In one embodiment, to ensure that the plurality of models 470A-D performs well with new, unseen data, the available training data of the processed storage 450 is split between training dataset 460A and validation dataset 460B. Typically, the training dataset 460A receives a larger portion or share (e.g., 80%) of the training data of the processed storage 450 while the validation dataset 460B gets a smaller portion or share (e.g., 20%) of the plurality of the training data. Once the training data (e.g., plurality of features of the processed storage 450) is split between the training dataset 460A and the validation dataset 460B, the plurality of models 470A-D may be trained and tested based on the training dataset 460A and the validation dataset 460.

Each model of the plurality of models 470A-D is trained to predict the probability of an error to occur in a GPU, CPU, DPU or other device of the data center 410 within a particular time period (e.g., within 10 minutes, within 30 minutes, within 1 hour, within 3 hours, within 1 day, within 1 week, etc.). Different models 470A-D may be trained to predict an error occurring within a different time period in embodiments. Depending on the embodiment, the plurality of models 470A-D may be trained to predict the probability of an error to occur in a GPU, CPU, DPU or other device of the data center 410 within any suitable time period (e.g., within minutes, days, weeks, months, years) and/or in any combination of time periods. For example, model 470A of the plurality of models 470A-D may be trained to predict the probability of an error to occur in a GPU, CPU, DPU or other device of the data center 410 within an hour of the current time, model 470B of the plurality of models 470A-D may be trained to predict the probability of an error to occur in a GPU, CPU, DPU or other device of the data center 410 within 3 hours of the current time, model 470C of the plurality of models 470A-D may be trained to predict the probability of an error to occur in a GPU, CPU, DPU or other device of the data center 410 within a day of the current time, and model 470D of the plurality of models 470A-D may be trained to predict the probability of an error to occur in a GPU, CPU, DPU or other device of the data center 410 within a week of the current time.

Depending on the embodiment, the plurality of models 470A-D may include additional models or more than one plurality of models (e.g., models that predict errors in still further time frames). The system 400 may include as many models as appropriate to accurately predict the probability of an error to occur (e.g., forecast an error) in a GPU, CPU, DPU and/or other device of the data center 410 sometime in the future. For example, a first plurality of models (e.g., 24 models) for each hour within a next 24 hours (e.g., one model for 1 hour predicting errors one hour in the future, one model for predicting errors 2 hours in the future, one model for predicting errors three hours in the future, etc.), a second plurality of models (e.g., 30 models) for each day within a next 30 days (e.g., one model for 1 day predicting errors one day in the future, one model for predicting errors 2 days in the future, one model for predicting errors three days in the future, etc.), a third plurality of models (e.g., 12 models) for each month within a next 12 months (e.g., one model for 1 month predicting errors one month in the future, one model for predicting errors 2 months in the future, one model for predicting errors three months in the future, etc.), and/or a combination of the first plurality of models, the second plurality of models, and/or the third plurality of models may be used. In an embodiment, the plurality of models may be less than the previously stated four models (e.g., the plurality of models 470A-D), equal to the previously stated four models, or exceed the previously stated four models.

In one embodiment, one or more model of the plurality of models 470A-D may be or include a gradient boost model such as an XGBoost model. A gradient boost machine is a machine learning model that uses a gradient boosting algorithm. Gradient boost machines may start by training a model where each observation is assigned an equal weight. An additional model is then trained using weighted data. Results of the original model and the additional model are compared, and that comparison is used to adjust weights on the data for training of another model. This process continues until a model is trained that has a target accuracy. Gradient boosting uses gradients in a loss function such as ($y=ax+b+e$), where e is the error term). Gradient boosting enables the optimization of specified cost functions. The loss function is a measure indicating how good model's coefficients are are at fitting the underlying data. XGBoost is a regularizing gradient boosting framework. Accordingly, XGBoost models may be models that take advantage of the XGBoost regularizing gradient boosting framework.

In one embodiment, one or more model of the plurality of models 470A-D may be or include an artificial neural network (e.g., such as a deep neural network). Artificial neural networks generally include a feature representation component with a classifier or regression layers that map features to a desired output space. A convolutional neural network (CNN), for example, hosts multiple layers of convolutional filters. Pooling is performed, and non-linearities may be addressed, at lower layers, on top of which a multi-layer perceptron is commonly appended, mapping top layer features extracted by the convolutional layers to decisions (e.g. classification outputs). Deep learning is a class of machine learning algorithms that use a cascade of multiple layers of nonlinear processing units for feature extraction and transformation. Each successive layer uses the output from the previous layer as input. Deep neural networks may learn in a supervised (e.g., classification) and/or unsupervised (e.g., pattern analysis) manner. Deep neural networks include a hierarchy of layers, where the different layers learn different levels of representations that correspond to different levels of abstraction. In deep learning, each level learns to transform its input data into a slightly more abstract and composite representation. In an image recognition application, for example, the raw input may be a matrix of pixels; the first representational layer may abstract the pixels and encode edges; the second layer may compose and encode arrangements of edges; the third layer may encode higher level shapes (e.g., teeth, lips, gums, etc.); and the fourth layer may recognize a scanning role. Notably, a deep learning process can learn which features to optimally place in which level on its own. The "deep" in "deep learning" refers to the number of layers through which the data is transformed. More precisely, deep learning systems have a substantial credit assignment path (CAP) depth. The CAP is the chain of transformations from input to output. CAPs describe potentially causal connections between input and output. For a feedforward neural network, the depth of the CAPs may be that of the network and may be the number of hidden layers plus one. For recurrent neural networks, in which a signal may propagate through a layer more than once, the CAP depth is potentially unlimited.

In one embodiment, one or more machine learning model 470A-D is or includes a recurrent neural network (RNN). An RNN is a type of neural network that includes a memory to enable the neural network to capture temporal dependencies. An RNN is able to learn input-output mappings that depend on both a current input and past inputs. The RNN will address past and future inputs and make predictions based on this continuous information. RNNs may be trained using a training dataset to generate a fixed number of outputs (e.g., to classify time varying data such as telemetry data). One type of RNN that may be used is a long short term memory (LS™) neural network. The LS™ model may classify, process, and predict errors based on time series data, thereby providing a contextual understanding of the state of the GPUs of the data center 410.

In one embodiment, one or more machine learning model 470A-D is or includes a k-nearest neighbor (K-NN) model. A K-NN model uses a non-parametric classification method used for classification and/or regression. For k-NN classification, the output of the trained model is a class membership. An object is classified by a plurality vote of its neighbors, with the object being assigned to the class most common among its k nearest neighbors (k is a positive integer, typically small). In k-NN regression, the output of the model is the property value for the object. This value is the average of the values of k nearest neighbors. Accordingly, The KNN model may provide classification of a detected error.

Further, any suitable machine learning algorithm suitable for prediction may be used. For example, an auto-encoder model may be used to predict a specific type of error to occur in a GPU, CPU, DPU and/or other device of the data center within a specific time period (e.g., using the pattern of reconstruction error of the auto-encoder model to identify a specific type of error).

In some embodiments, an ensemble machine learning approach is used, in which multiple candidate models are trained for each time period (e.g., a first set of models is trained to predict errors within a first time period, a second set of models is trained to predict errors within a second time period, a third set of models is trained to predict errors within a third time period, and so on). For example, a gradient boost model, an LS™ model, a k-NN model and/or another type of neural network may be trained to predict errors that might occur within a 1 hour time period (e.g., 1 hour into the future). Each of the models may be tested, and a model that is most accurate may be selected for use. Alternatively, multiple models may be selected for parallel or combined use. Accordingly, models 470A-D may each represent a collection of models that predicts and/or classifies errors within the same time period.

Accordingly, each model of the plurality of models 470A-D may represent an ensemble model which trains multiple learning algorithms (or networks) and/or models and selects among those to obtain better predictive performance than could be obtained from single machine learning algorithms (or networks) alone. Accordingly, one or more model of the plurality of models 470A-D may be an ensemble model of a first model (e.g., of an XG boost model), a second model (e.g., an RNN model), a third model (e.g., an LS™ model), and so on trained to predict an error to occur within the next predetermined time period.

In training the plurality of models 470A-D, the plurality of features generated by the feature processing module 430 (e.g., features associated with the aggregated telemetry data) may provide temporal distribution of telemetry data for an individual GPU of the data center 410 and/or for one or more healthy GPUs of the data center 410. Accordingly, the temporal distribution of telemetry data for an individual GPU of the data center 410 and/or healthy GPUs of the data center 410 can be observed to provide relevant deterministic states of GPUs of the data center 410.

In an example, an equation: $h_t = h_{t-1} + F_o(h_{t-1}, x_t)$, associated with the LS™ model, assists in determining a state of a GPU of the data center 410. The equation contains $F_o$, which refers to recurrent computation, $x_t$ which refers to the feature at time t, and $h_{t-1}$ which refers to the hidden state of the GPU from the previous time step (e.g., a previous time interval, such as 1 hour). Thus, the equation provides a state of the GPU at time t based on the previous hidden state of the GPU and a recurrent computation of the previous hidden state of the GPU and the feature at time t.

Further, gating may be applied to the LS™ model through the corresponding equation to control how much the previous hidden state updates the recurrent computation of the previous hidden state of the GPU and the feature at time t and how much the previous hidden state passes to the current hidden state of the GPU. For example, the updated equation with gating: $h_t = \mu(h_{t-1}, x_t)h_{t-1} + \lambda(h_{t-1}, x_t)F_o(h_{t-1}, x_t)$, associated with the LS™ model, fine-tunes determining a state of a GPU of the data center 410. The updated equation further contains and X which refer to weights for the previous hidden state of the GPU from the previous time step and the respective feature at time t.

Depending on the embodiment, one or more model of the plurality of models 470A-D may include a softmax function in an output layer of the model to convert outputs into probabilities of an error.

In some embodiments, multiple models may be used in order to provide additional contextual understanding of the type of error occurring in an individual GPU of the data center 410. Accordingly, as noted above, each model of the plurality of models 470A-D may be an ensemble model of a gradient boost model to predict an error to occur within the next predetermined time period, a LS™ model to provide contextual understanding of the state of the GPUs of the data center 410, and/or an additional model, such as, a K-Nearest Neighbor (KNN) model to provide classification of the error (e.g., type of error) likely to occur in a GPU of the data center 410.

The KNN model may provide classification of the error. In training the plurality of models 470A-D, each model of the plurality of models 470A-D may receive predetermined errors associated with the GPUs of the data center 410 to assist in classification.

Depending on the embodiment, one of a KNN model, an LS™ model, or a gradient boost model may be the only model used to predict an error to occur in a GPU, CPU, DPU or other device of the data center within a specific time period. Once the plurality of models 470A-D (e.g., gradient boost models, LS™ models, KNN models, or ensemble models) is trained, the plurality of models 470A-D may be stored in model storage 480. Model storage 480 may be physical memory and may include volatile memory devices (e.g., random access memory (RAM)), non-volatile memory devices (e.g., flash memory, NVRAM), and/or other types of memory devices. In another example, model storage 480 may include one or more mass storage devices, such as hard drives, solid-state drives (SSD)), other data storage devices, or a combination thereof. In yet another example, model storage 480 may be any virtual memory, logical memory, other portion of memory, or a combination thereof for storing, organizing, or accessing data. In a further example, model storage 480 may include a combination of one or more memory devices, one or more mass storage devices, virtual memory, other data storage devices, or a combination thereof, which may or may not be arranged in a cache hierarchy with multiple levels. Depending on the embodiment, the model storage 480 may be a part of the data center (e.g., local storage) or a networked storage device (e.g., remote).

In some embodiments, system 400 may further include a validation report (not shown). The validation report may provide an indication of the top features utilized by the plurality of models 470A-D, the accuracy of the plurality of models 470A-D, the positive predictive value of the plurality of models 470A-D, the negative predictive value of the plurality of models 470A-D, and/or any suitable metric associated the plurality of models 470A-D.

In some embodiments, each of the plurality of models 470A-D is retrained daily, weekly, and/or monthly. In embodiments, some models are trained daily (e.g., models that predict errors within an hour or within 3 hours) and other models are trained less frequently (e.g., models that predict errors within weeks or months). The unified storage 420 continues to receive telemetry data from all the GPUs, CPUs and/or other devices in the data center 410, which is then stored in the historical telemetry storage 430 for feature processing. Feature processing module 4440 generates additional features to retrain the plurality of models 470A-D based on the most recent telemetry data obtained within the past day, week, and/or month. The plurality of models 470A-D stored in model storage 480 are updated with the plurality of retrained models (or replaced models) for use in forecasting an error in a GPU of the data center.

Figure 5:
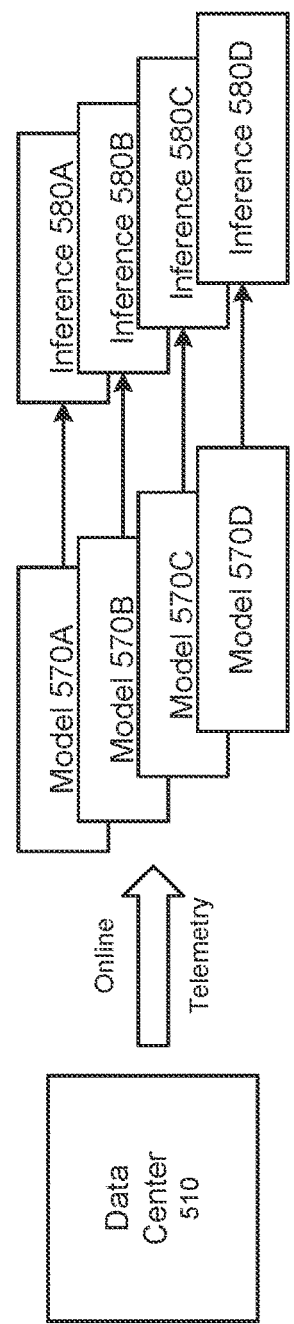
FIG. 5 illustrates predicting a probability of an error occurring in a GPU of the data center within various predetermined time periods based on the trained machine learning models of FIG. 4B, according to at least one embodiment

FIG. 5 illustrates system 500 for predicting a probability of an error to occur in a GPU, CPU, DPU or other device (for example, of a data center or other system). In at least one embodiment, system 500 includes a data center 510, similar to data center 410 of FIG. 4A and a plurality of trained models 570A-D, similar to the plurality of models 470A-D of FIG. 4B stored in model storage 480 of FIG. 4B.

To identify whether a GPU of the data center 510 is likely to experience an error, online telemetry data (e.g., live telemetry data) may be fed into the plurality of trained models 570A-D. In some embodiments, features may be computed on telemetry data as the telemetry data is received, and the features may be fed into the plurality of trained models 570A-D in addition to or instead of the live telemetry data. Each of the plurality of trained models 570A-D provides an inference (e.g., inferences 580A-D, respectively). Each inference of the plurality of inferences 580A-D provides a probability of an error to occur in the GPU (e.g., the GPU associated with the online telemetry data) at some specified time in the future. For example, inference 580A may provide a probability of an error to occur in the GPU associated with the online telemetry data within an hour of the current time based on the trained model 570A, inference 580B may provide a probability of an error to occur in the GPU associated with the online telemetry data within 3 hours of the current time based on the trained model 570B, inference 580C may provide a probability of an error to occur in the GPU associated with the online telemetry data within a day of the current time based on the trained model 570C, and inference 580D may provide a probability of an error to occur in the GPU associated with the online telemetry data within a week of the current time based on the trained model 570D. Inferences 508A-D may additionally include a classification of a predicted error in some embodiments.

In some embodiments, each inference of the plurality of inference 580A-D may be provided to a user via a graphical user interface (GUI) to indicate the specific time in the future an error is forecasted to occur in a GPU, CPU, DPU or other device of the data center 510. In some embodiments, a device health score may be provided to the user via the GUI. The device health score may be between 0 and 100, where 0 indicates the lowest probability of an error in the device and 100 indicates the highest probability of an error in the device. The device health score may be determined by applying a weight to each inference of the plurality of inferences 580A-D and obtaining a sum of the plurality of inferences 580A-D and their respective weights. Accordingly, a higher weight may be applied to an inference of the plurality of inferences 580A-D that provides the greatest accuracy in predicting whether an error is forecasted to occur in the device and the weights applied to other inferences of the plurality of inference 580A-D may be gradually reduced or negated based on the respective inference of the plurality of inference 580A-D providing lower accuracy in predicting whether an error is forecasted to occur in the GPU. In some embodiments, inferences are weighted at least in part based on when an error is predicted to occur. Errors predicted to occur in the near future (e.g., in 1 hour) may be weighted higher than errors predicted to occur later in the future (e.g., in 1 week).

Thus, based on the device health score, a user may be able to act accordingly, for example, if the device health score is high (indicating an imminent failure), the user may decide to implement preventive measures to prevent an actual error of the device. In some embodiments, a predetermined threshold may be set to indicate whether the device is of interest due to an increased probability of errors. For example, if a device health score exceeds the predetermined threshold (e.g., 65), an alert may be sent to the user via the GUI to indicate that the device has a high probability of error. A classification of the predicted error may also be provided via the GUI in embodiments.

In some embodiments, one or more actions may automatically be performed based on an estimated error. In some embodiments, one or more actions are automatically performed based on the computed device health score. Different actions and/or recommendations may be associated with different device health scores. For example, if the device health score exceeds a high threshold, this may indicate imminent errors and/or failure, and a first action may be performed (e.g., such as transferring the device's workload to other devices and taking the device offline). If the device health score is below the high threshold but above a lower threshold, then a second action may be performed (e.g., such as adjusting a workload of the device).

Figure 6:
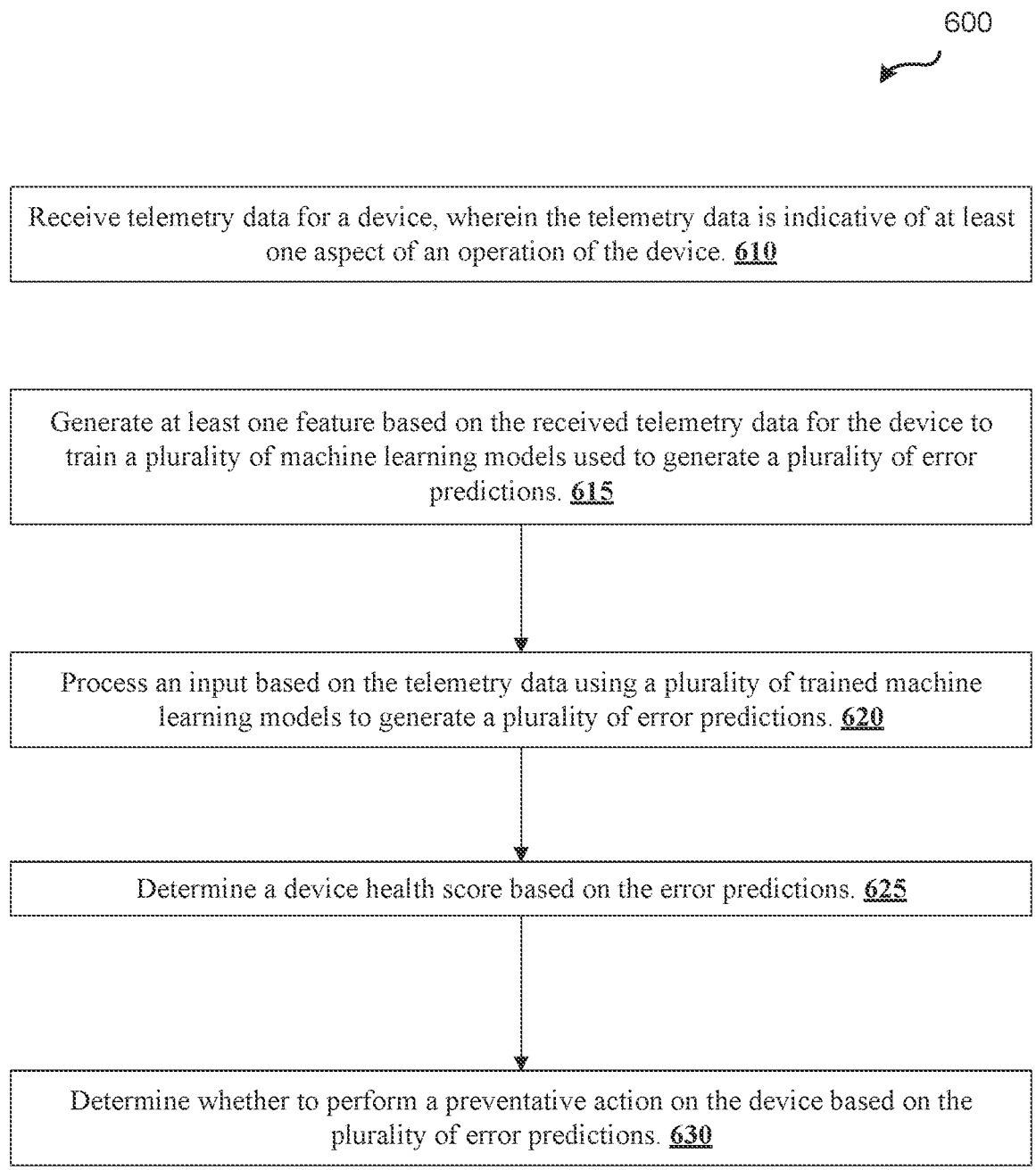
FIG. 6 is a flow diagram of predicting a probability of an error occurring in a graphics processing unit of a data center within various predetermined time periods, according to at least one embodiment.

FIG. 6 is an example flow diagram for a process 600 to predict a probability of an error occurring in a GPU, CPU, DPU or other device (such as in such a device of a data center) within various predetermined time periods, in accordance with at least one embodiment. In at least one embodiment, process 600 may be performed by inference and/or training logic 115. Details regarding inference and/or training logic 115 are provided herein in conjunction with FIGS. 1A and/or 1B. In at least one embodiment, inference and/or training logic 115 may be used in system FIG. 3 for inferencing or predicting operations using a set of trained machine learning models.

Referring to FIG. 6, at block 610, the processing logic receives telemetry data for a device. The device may be a graphical processing unit (GPU), a CPU, a DPU, or another type of device. The telemetry data is indicative of at least one aspect of an operation of the device. As previously described, data for errors (e.g., from error logs), power usage (e.g., power usage), (e.g., sm_clock), frame buffer utilization (e.g., fb_used), device temperature (e.g., gpu_temp), device memory temperature (e.g., memory temp), device utilization rate (e.g., gpu_utilization), device memory utilization (e.g., mem_copy_utilization), and so on may be included in the telemetry data.

At block 615, the processing logic generates at least one feature based on the received telemetry data for the device to train a plurality of machine learning models used to generate a plurality of error predictions. As previously described, the received telemetry data for the device are aggregated and then at least one feature may be generated based on aggregated historical telemetry data of devices that did not have an error within a window such as a moving window or aggregated historical telemetry data of each individual device. The features may include standard deviation, z-score, moving average, moving standard deviation of the individual device and/or standard deviation, z-score, maximum value, minimum value of healthy devices. Accordingly, the plurality of machine learning models are trained with the features to generate a plurality of error predictions At block 620, the processing logic processes an input based on the telemetry data using a plurality trained machine learning models to generate a plurality of error predictions (e.g., inferences). The plurality of trained machine learning models may include a first trained machine learning model and a second trained machine learning model. The first trained machine learning model may output a first error prediction of the plurality of error predictions. The first error prediction may include a probability of an error occurring within a first future time period. The second trained machine learning model may output a second error prediction of the plurality of error predictions. The second error prediction may include a probability of an error occurring within a second future time period. In some embodiments, the first error prediction may identify a type of potential error that will occur within the first future time period and/or the second error prediction may identify a type of potential error that will occur within the second future time period.

In some embodiments, the plurality of trained machine learning models may further include a third trained machine learning model and a fourth trained machine learning model. The third trained machine learning model may output a third error prediction of the plurality of error predictions. The third error prediction may include a probability of an error occurring within a third future time period. The fourth trained machine learning model may output a fourth error prediction of the plurality of error predictions. The fourth error prediction may include a probability of an error occurring within a fourth future time period.

Depending on the embodiment, each of the plurality of trained machine learning models may be or include a recurrent neural network, an XG boost model, a K-nearest neighbor model, or an ensemble of any suitable combination of the RNN, XG boost, and KNN.

At block 625, the processing logic determine a device health score based on the error predictions. As previously described, a weight is applied to each error prediction of the plurality of error predictions based on their relevancy to accurately predicting the probability of an error to occur in the device. Accordingly, a sum of the plurality of error predictions and their respective weights is calculated to determine a device health score between 0 and 100. Device health score of 0 indicates that there is a lowest probability of an error in the device and 100 indicates that there is a highest probability of an error in the device.

At block 630, the processing logic determines whether to perform a preventative action on the device based on the plurality of error predictions. In some embodiments, the processing logic determines when to perform the preventative action based on the plurality of error predictions. To determine whether to perform a preventative action on the device and when to perform the preventative action on the device, the processing logic, based on the device health score, provides a notification that the device is predicted to fail within the first future time period or the second future time period. In some embodiments, the notification is a prediction of error within the first future time period, the second future time period, the third future time period, or the fourth future time period. As previously described, the notification may be the device health score. In some embodiments, the device health score may be based on any combination of the prediction of error within the first future time period, the second future time period, the third future time period, and the fourth future time period.

In some embodiments, the processing logic determines when to perform the preventative action based on the plurality of error predictions. To determine whether to perform a preventative action on the device and when to perform the preventative action on the device, the processing logic provides a notification that the device is predicted to fail within the first future time period or the second future time period. In some embodiments, the notification is a prediction of error within the first future time period, the second future time period, the third future time period, or the fourth future time period. As previously described, the notification may be a health score of the device based on a combination of the prediction of error within the first future time period, the second future time period, the third future time period, and the fourth future time period.

Depending on the embodiment, the processing logic may periodically retrain the plurality of trained machine learning models based on telemetry data for a plurality of devices that share a common device type that was generated after the plurality of trained machine learning models were last trained. The common device type may be other GPUs of the data center.

FIG. 7 is an example flow diagram for a process 700 to train a plurality of machine learning models to predict a probability of an error occurring in a graphics processing unit of a data center within various predetermined time periods, in accordance with at least one embodiment. In at least one embodiment, process 700 may be performed by inference and/or training logic 115. Details regarding inference and/or training logic 115 are provided herein in conjunction with FIGS. 1A and/or 1B.

Referring to FIG. 7, at block 710, the processing logic receives historical (e.g., aggregate) telemetry data for a plurality of devices that share a common device type. As previously described, the plurality of devices that share a common device type may be a plurality of graphical processing units of a data center, a plurality of CPUs, a plurality of DPUs, or a plurality of other like devices.

At block 715, the processing logic generates at least one feature based on the historical telemetry data for the plurality of devices to train a plurality of machine learning models used to generate error predictions. As previously described, the historical telemetry data for the plurality of devices are aggregated based on devices that did not have an error within a window such as a moving window or aggregated for each device of the plurality of devices individually. The features may include standard deviation, z-score, moving average, moving standard deviation of the individual device and/or standard deviation, z-score, maximum value, minimum value of healthy devices.

At block 720, the processing logic trains a plurality of machine learning models to generate error predictions for devices having the device type based on the historical telemetry data. The plurality of machine learning models are trained based on the features to generate error predictions for devices having the device type. As previously described, each model of the plurality of machine learning models may be trained to generate an error prediction for devices within a unique window (e.g., one model trained to generate an error prediction for devices within 1 hour, one model trained to generate an error prediction for devices within 3 hours, one model trained to generate an error prediction for devices within 1 day, etc.). Each model of the plurality of machine learning models may be trained using different machine learning algorithms and may include one or an ensemble of machine learning algorithms. Each model may use a unique machine learning algorithm or combination of machine learning algorithms. Accordingly, the processing logic may select a machine learning algorithm or combination of machine learning algorithms for each machine learning model based on the window in which the machine learning model is to generate error predictions for.

To train the plurality of machine learning models, the processing logic trains a first machine learning model to output a first error prediction comprising a first probability of an error occurring within a first time period and trains a second machine learning model to output a second error prediction comprising a second probability of an error occurring within a second time period. As previously described, the first error prediction may identify a type of potential error that is estimated to occur within the first time period and the second error prediction may identify a type of potential error that is estimated to occur within the second time period.

Depending on the embodiment, the processing logic may further train a third machine learning model to output a third error prediction comprising a third probability of an error occurring within a third time period and train a fourth machine learning model to output a fourth error prediction comprising a fourth probability of an error occurring within a fourth time period. Accordingly, similar to the first error prediction and the second error prediction, the third error prediction may identify a type of potential error that is estimated to occur within the third time period and the fourth error prediction may identify a type of potential error that is estimated to occur within the fourth time period. In some embodiments, the processing logic may periodically retrain the plurality of machine learning models based on telemetry data for the plurality of devices that was generated after the plurality of machine learning models were last trained.

Anomaly Detection

In some embodiments, in addition to or instead of using trained machine learning models to predict errors, one or more logics are used to detect anomalies in telemetry data.

Figure 8:
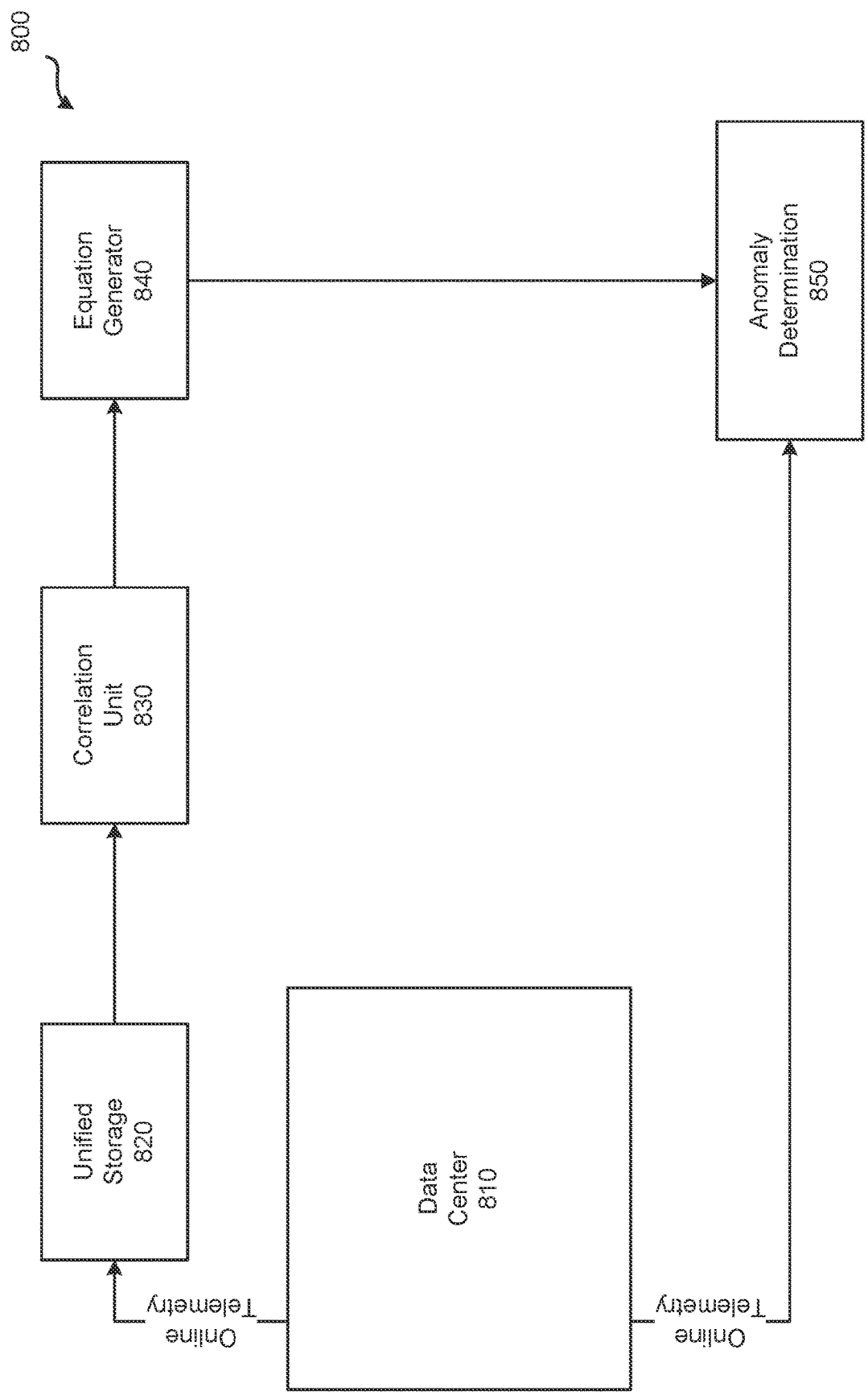
FIG. 8 illustrates determining whether an anomaly is occurring in a GPU of the data center, according to at least one embodiment.
Figure 10:
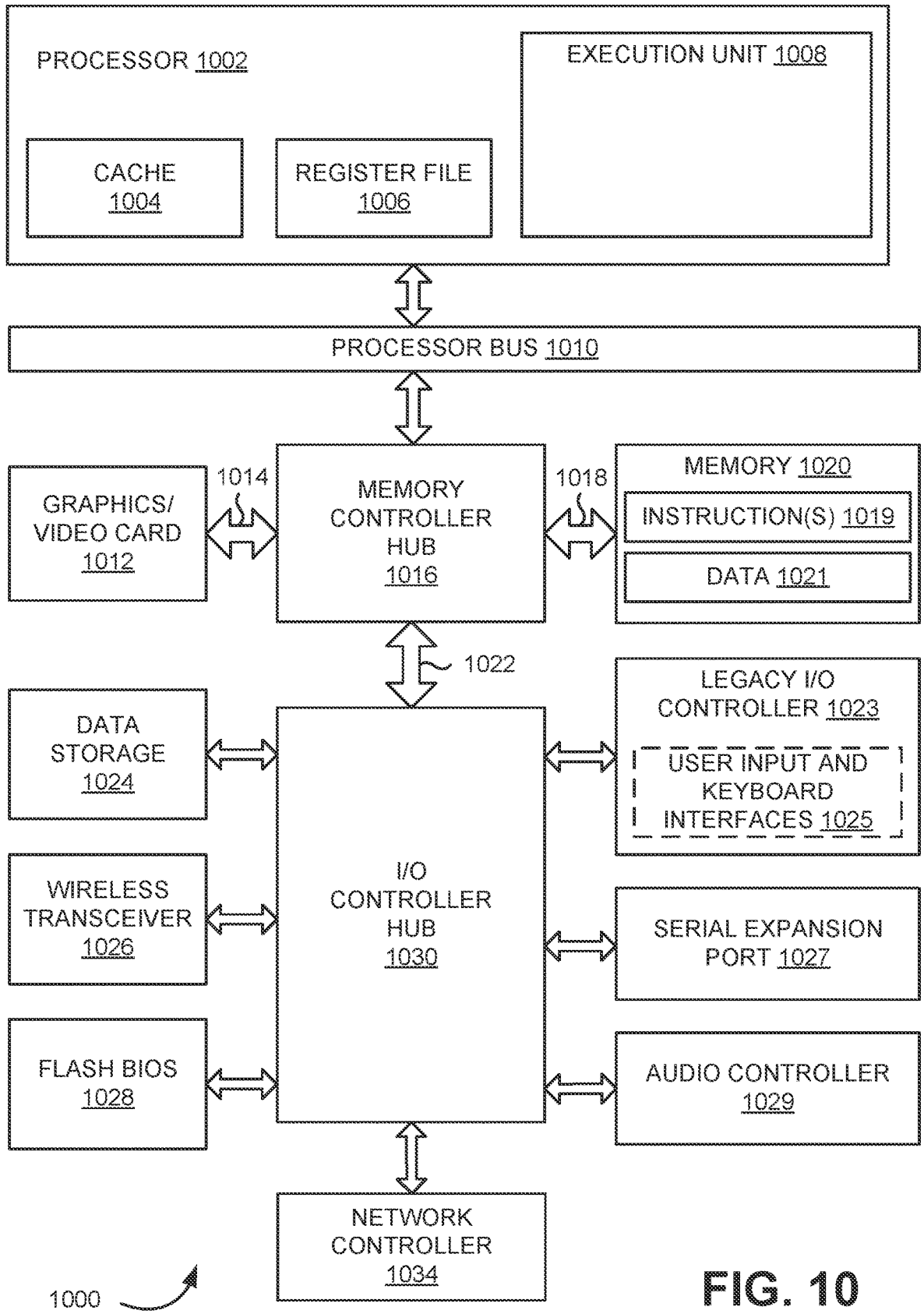
FIG. 10 is a block diagram illustrating a computer system, according to at least one embodiment.

FIG. 8 illustrates system 800 for determining whether an anomaly is occurring in a GPU, CPU, DPU or other device (e.g., of a data center), according to at least one embodiment. In at least one embodiment, system 800 includes a data center 810, a unified storage 820, similar to unified storage 420 of FIG. 4, a correlation module 830, an equation generation module 840, and an anomaly determination module 850.

Data center 810, similar to data center 300 of FIG. 3, contains a plurality of node computing resources (e.g., GPUs, CPUs, DPUs, other devices, etc.). The telemetry data of each device of the data center 810 may be stored in a unified storage 820.

Unified storage 820 may be physical memory and may include volatile memory devices (e.g., random access memory (RAM)), non-volatile memory devices (e.g., flash memory, NVRAM), and/or other types of memory devices. In another example, unified storage 820 may include one or more mass storage devices, such as hard drives, solid-state drives (SSD)), other data storage devices, or a combination thereof. In yet another example, unified storage 820 may be any virtual memory, logical memory, other portion of memory, or a combination thereof for storing, organizing, or accessing data. In a further example, unified storage 820 may include a combination of one or more memory devices, one or more mass storage devices, virtual memory, other data storage devices, or a combination thereof, which may or may not be arranged in a cache hierarchy with multiple levels. Depending on the embodiment, the unified storage 820 may be a part of the data center (e.g., local storage) or a networked storage device (e.g., remote). Depending on the embodiment, the telemetry data of each device (e.g., each GPU) of the data center 810 may be stored in their respective memory storage devices (e.g., memory storage devices 318(1)-318(N) of FIG. 3) prior to being stored in the unified storage 820. In some embodiments, rather than storing the telemetry data of each device of the data center 810, the telemetry data may be accessed from their respective memory storage devices.

Correlation module 830 may receive, from the unified storage 810, telemetry data of the devices (e.g., GPUs) of the data center 810 within a past predetermined time period (e.g., a month). Based on the telemetry data of the devices of the data center 810 within the past predetermined time period, the correlation module 830 determines a correlation between the plurality of operational metrics of the telemetry data of the devices of the data center 810. In some embodiments, to determine a correlation between the plurality of operational metrics of the telemetry data of the devices of the data center, the correlation module 830 determines the strength and direction of correlations between an operational metric of the plurality of operational metrics of the telemetry data of the devices of the data center 810 and the other of operational metrics of the plurality of operational metrics of the telemetry data of the devices of the data center 810.

In one embodiment, the strength of correlation may be determined based on the Pearson's correlation coefficient) function or Pearson's function, Spearman's rank-order correlation function, or any other suitable function to determine the strength and direction of a correlation between variables. The Pearson's correlation function returns a correlation coefficient between "−1," indicating a negative correlation between a first value and a set of second values and "1" indicating a positive correlation between the first value and the set of second values. In particular, a strong positive correlation may be between +0.8 and +1, a strong negative correlation may be between −8 and −1, a moderate positive correlation may be between +0.5 and +0.79, a moderate negative correlation may be between −0.5 and −0.79, a weak positive correlation may be between +0.1 and +0.49, a weak negative correlation may be between −0.1 and −0.49, and no correlation may be between +0.1 and −0.1.

For each operational metric of the plurality of operational metrics, the correlation module 830 may determine a correlation coefficient for each of the other operational metrics of the plurality of operational metrics by using the respective operational metric of the plurality of operational metrics as the first value and each of the other operational metric of the plurality of operational metrics as the set of second values. For example, for an operational metric of the plurality of operational metrics (e.g., power usage), the correlation module 830 calculates a correlation coefficient for power usage and system clock, power usage and frame buffer utilization, power usage and device temperature, power usage and memory temperature, power usage and device utilization, power usage and memory copy utilization, etc.

The correlation module 830 may store, for each operational metric of the plurality of operational metrics (e.g., power usage), a correlation data structure including each of the correlation coefficient and/or their respective operational metric (e.g., [0.1, system clock], [0.3, frame buffer utilization], [0.2, device temperature], [0.8, memory temperature], [0.5, device utilization], [0.35, memory copy utilization], etc.). In some embodiments, the correlation module 830 may store in the correlation data structure a subset of the correlation coefficient and/or their respective operational metric associated with the operational metric of the plurality of operational metrics (e.g., power usage). The determination of the subset of the correlation coefficient and/or their respective operational metric may be based on the strength and/or direction of the correlation. For example, the subset of the correlation coefficient and their respective operational metric may include only those determined to be correlated based on exceeding a threshold (e.g., any correlation coefficient not between +0.1 and −0.1).

The equation generation module 840 may receive each correlation data structure of the plurality of operational metrics to generate a corresponding equation to determine an expected value of the operational metric associated with the correlation data structure. The equation generation module 840 is based on the correlation coefficient and their respective operational metric. For example, the equation generation module 840 generates an equation for operational metric (e.g., power usage) using the correlation data structure of the operational metric (e.g., [0.1, system clock], [0.3, frame buffer utilization], [0.2, device temperature], [0.8, memory temperature], [0.5, device utilization], [0.35, memory copy utilization]. The equation generated by the equation generation module 840 may be power usage=0.1*system clock+0.3*frame buffer utilization+0.2*device temperature+0.8*memory temperature+0.5*device utilization+0.35*memory copy utilization. Accordingly, for one or more metrics (e.g., types of telemetry data), functions may be generated that relate a particular metric to a set of other metrics. If values for the set of metrics are input into the function, a resulting value for the particular metric may be computed. Multiple such functions may be generated, where each function may be for a different metric or type of telemetry data. In some embodiments, the equation generation module 840 may be based on a summation of the correlation coefficient and their respective operational metric. In some embodiments, the correlation coefficient may be replaced with an alternative value corresponding to a strength of the correlation indicated by the correlation coefficient. Any other suitable equation based on the correlation coefficient and their respective operational metric of the correlation data structure associated with the operational metric may be generated to assist in determining an estimated value of the operational metric corresponding to the correlation data structure.

In some embodiments, the equation generation module 840 may validate each equation of the plurality of operational metrics. In some embodiments, to validate the equations, the equation generation module 840 splits the plurality of operational metrics to determine whether the results of the equations are within range of the actual value of the operational metric associated with the equations. Upon splitting the plurality of operational metrics, in one embodiment the equation generation module 840 performs gradient boost operations on the results of the equations as compared with the actual value of the operational metric associated with the equations. Based on the result of the gradient boost operations, the equation may be modified to provide an equation that more accurately predicts the estimated value of the operational metric associated with the equation. Depending on the embodiment, any suitable machine learning model may be used to identify a correlation and generate an equation to accurately predict the value of the operational metric. For example, rather than generating explicit functions, one or more machine learning models may be trained to receive telemetry data for a set of metrics as input and to provide an estimated value for another metric as an output. Accordingly, machine learning models may be used instead of equations or explicit functions in embodiments.

Anomaly determination module 850 may receive online telemetry data (e.g., live telemetry data) of a GPU of the data center 810. Based on the received online telemetry data (e.g., live telemetry data) of the GPU of the data center 810, the anomaly determination module 840 may calculate (e.g., estimate), for one or more operational metric of the plurality of operational metrics, an expected value based on the received online telemetry data (e.g., actual values of the plurality of operational metrics associated with the received online telemetry data). Each of the estimated metric values may be generated using one of the functions or machine learning models trained to estimate those metric values.

The anomaly determination module 850 may further calculate an anomaly score for each operational metric of the plurality of operational metrics. The anomaly score may be calculated based on a difference between an actual value of a respective operational metric of the plurality of operational metrics and the expected value of the respective operational metric of the plurality of operational metrics. In some embodiments, the anomaly score is computed by determining the difference and then dividing by a mean absolute error of the respective operational metric of the plurality of operational metrics. Based on the anomaly score of the respective operational metric of the plurality of operational metrics, the anomaly determination module 850 may determine whether there is an anomaly in the respective operational metric of the plurality of operational metrics. In one embodiment, to determine whether there is an anomaly in the respective operational metric of the plurality of operational metrics, the anomaly determination module 840 determines the anomaly score placement along a normal distribution (e.g., a Gaussian distribution) of the respective operational metric of the plurality of operational metrics.

For example, the anomaly determination module 850 may determine there is no anomaly in the respective operational metric of the plurality of operational metrics if the anomaly score falls between mean plus-minus (±) the standard deviation of the normal distribution. Otherwise, the anomaly determination module 850 may determine there is an anomaly in the respective operational metric of the plurality of operational metrics if the anomaly score falls outside the mean plus-minus (±) the standard deviation of the normal distribution. Mean plus-minus (±) the standard deviation of the normal distribution, for example, reduces the number of false alerts of an anomaly being detected in the respective operational metric of the plurality of operational metrics. However, other statistical distribution models may be used to detect anomalies more accurately based on the anomaly score. In some embodiments, once a determination that an anomaly has been detected, an indication of the operational metric of the plurality of operational metrics that are experiencing an anomaly is provided to the user via the GUI.

Depending on the embodiments, the anomaly determination module 850 may indicate a warning of an anomaly in the respective operational metric of the plurality of operational metrics if the anomaly score exceeds a first quintile, a minor anomaly in the respective operational metric of the plurality of operational metrics if the anomaly score falls between a mean of the normal distribution and a fifth quintile of the normal distribution, a major anomaly in the respective operational metric of the plurality of operational metrics if the anomaly score exceeds the fifth quintile of the normal distribution, and a critical anomaly in the respective operational metric of the plurality of operational metrics if the anomaly score exceeds a predetermined threshold within the fifth quintile of the normal distribution. Thus, whether there is a warning of an anomaly, minor anomaly, major anomaly, or critical anomaly detected, an indication of the level of the anomaly of the operational metric of the plurality of operational metrics may be provided to the user via the GUI.

In some embodiments, the anomaly determination module 850 may further determine if there is an anomaly in the GPU of the data center 810 as a whole. Accordingly, the anomaly determination module 850 may obtain a GPU anomaly score based on a summation of the anomaly score of each of the plurality of operational metrics of the GPU. In some embodiments, a predetermined threshold may be set to indicate whether there is an anomaly in the GPU. Thus, if the GPU anomaly score exceeds the predetermined threshold, an alert may be sent to the user via the GUI to indicate that there is an anomaly in the GPU and there is a high probability of error.

FIG. 9 is an example flow diagram for a process 900 to identify an anomaly in a graphics processing unit of a data center, in accordance with at least one embodiment. In at least one embodiment, process 900 may be performed by inference and/or training logic 115. Details regarding inference and/or training logic 115 are provided herein in conjunction with FIGS. 1A and/or 1B. In at least one embodiment, inference and/or training logic 115 may be used in system FIG. 3 for inferencing or predicting operations based, at least in part, on weight parameters calculated using neural network training operations, neural network functions and/or architectures, or neural network use cases described herein.

Referring to FIG. 9, at block 910, the processing logic receives historical telemetry data indicative of at least one aspect of an operation of the device. The telemetry data includes a first parameter and a second set of parameters. As previously described, the telemetry data may be, among other operational metrics of the operations of the device, power usage and system clock, power usage and frame buffer utilization, power usage and device temperature, power usage and memory temperature, power usage and device utilization, power usage and memory copy utilization, etc.

At block 920, the processing logic determines a first value of the first parameter from the telemetry data. As previously described, the first value of the first parameter from the telemetry data is the actual value of the first parameter from the telemetry data.

At block 930, the processing logic estimates a second value for the first parameter based on inputting the values of the second set of parameters into a function that relates the first parameter to the second set of parameters. In some embodiments, the processing logic may generate the function using historical (e.g., aggregated) telemetry data. As previously described, the function may be generated based on a correlation between each of the telemetry data (e.g., the first parameter and the second set of parameters). Depending on the embodiment, the processing logic may periodically update the function using the additional telemetry data received after the function was generated. As previously described, a trained machine learning model may be used to adjust the accuracy of the generated function to estimate the second value of the first parameter based on inputting the values of the second set of parameters into the generated function that relates the first parameter to the second set of parameters.

At block 940, the processing logic determines a different between the first value and the second value. At block 950, the processing logic determines whether an anomaly is detected based at least in part on the difference between the first value and the second value. As previously described, the anomaly may be determined based on a difference between the first value (e.g., actual value) minus the second value (e.g., expected value) divided by a mean absolute error of the first value (e.g., actual value).

In some embodiments, the processing logic may estimate values for one or more additional parameters of the telemetry data from other parameters of the telemetry data using one or more additional functions. The processing logic may determine differences between the estimated values and measured values for the one or more additional parameters. Based on a combination of the difference and the one or more additional differences, the processing logic may determine an anomaly score of the device. The processing logic may determine whether the anomaly is detected based on the anomaly score. Depending on the embodiment, the processing logic may determine a level of the anomaly of the device based on a location of the anomaly score of the device on a Gaussian distribution.

In some embodiments the processing logic may process an input based on the telemetry data using a plurality of trained machine learning models to generate a plurality of error predictions. The plurality of trained machine learning models may include a first trained machine learning model and a second trained machine learning model. The first trained machine learning model may output a first error prediction of the plurality of error predictions. The first error prediction may include a probability of an error occurring within a first future time period. The second trained machine learning model may output a second error prediction of the plurality of error predictions. The second error prediction may include a probability of an error occurring within a second future time period. In some embodiments, the first error prediction may identify a type of potential error that will occur within the first future time period and the second error prediction may identify a type of potential error that will occur within the second future time period.

In some embodiments, the processing logic determines whether to perform a preventative action on the device based on the plurality of error predictions. In some embodiments, the processing logic determines when to perform the preventative action based on the plurality of error predictions. To determine whether to perform a preventative action on the device and when to perform the preventative action on the device, the processing logic provides a notification that the device is predicted to fail within the first future time period or the second future time period. In some embodiments, the notification is a prediction of error within the first future time period, the second future time period, the third future time period, or the fourth future time period. As previously described, the notification is a prediction of error based on a combination of the prediction of error within the first future time period, the second future time period, the third future time period, and the fourth future time period. As previously described, the notification may be a score based on the combination.

Computer Systems

Figure 11:
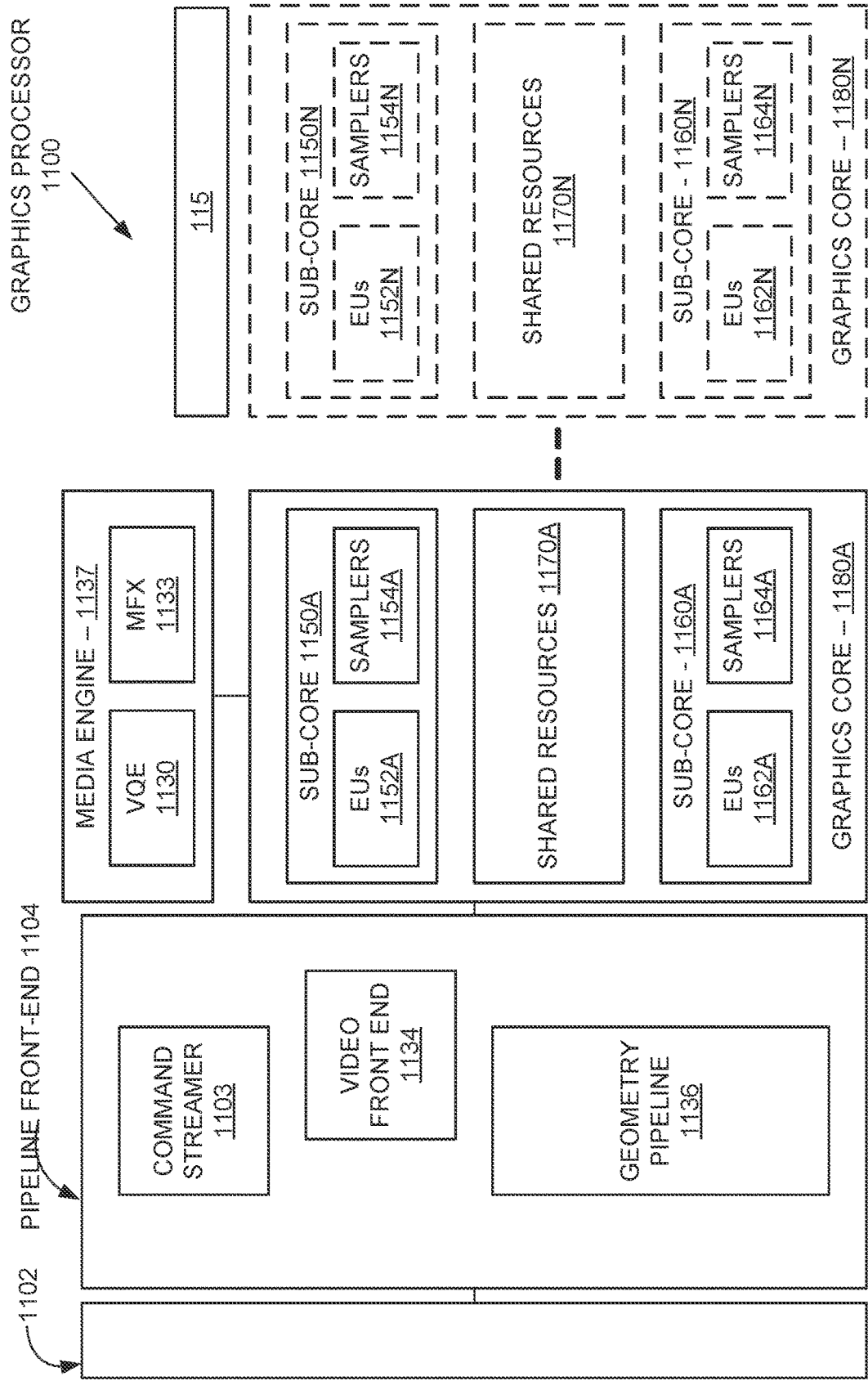
FIG. 11 illustrates a graphics processor, according to at least one embodiment.

FIG. 11 is a block diagram illustrating an exemplary computer system, which may be a system with interconnected devices and components, a system-on-a-chip (SOC) or some combination thereof formed with a processor that may include execution units to execute an instruction, according to at least one embodiment. In at least one embodiment, a computer system 1100 may include, without limitation, a component, such as a processor 1102 to employ execution units including logic to perform algorithms for process data, in accordance with present disclosure, such as in embodiment described herein. In at least one embodiment, computer system 1100 may include processors, such as PENTIUM® Processor family, Xeon™ Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 1100 may execute a version of WINDOWS operating system available from Microsoft Corporation of Redmond, Wash., although other operating systems (UNIX and Linux, for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), set-top boxes, network hubs, wide area network ("WAN") switches, or any other system that may perform one or more instructions in accordance with at least one embodiment.

In at least one embodiment, computer system 1100 may include, without limitation, processor 1102 that may include, without limitation, one or more execution units 1108 to perform machine learning model training and/or inferencing according to techniques described herein. In at least one embodiment, computer system 1100 is a single processor desktop or server system, but in another embodiment, computer system 1100 may be a multiprocessor system. In at least one embodiment, processor 1102 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. In at least one embodiment, processor 1102 may be coupled to a processor bus 1110 that may transmit data signals between processor 1102 and other components in computer system 1100.

In at least one embodiment, processor 1102 may include, without limitation, a Level 1 ("L1") internal cache memory ("cache") 1104. In at least one embodiment, processor 1102 may have a single internal cache or multiple levels of internal cache. In at least one embodiment, cache memory may reside external to processor 1102. Other embodiments may also include a combination of both internal and external caches depending on particular implementation and needs. In at least one embodiment, a register file 1106 may store different types of data in various registers including, without limitation, integer registers, floating point registers, status registers, and an instruction pointer register.

In at least one embodiment, execution unit 1108, including, without limitation, logic to perform integer and floating point operations, also resides in processor 1102. In at least one embodiment, processor 1102 may also include a microcode ("ucode") read only memory ("ROM") that stores microcode for certain macro instructions. In at least one embodiment, execution unit 1108 may include logic to handle a packed instruction set (not shown). In at least one embodiment, by including packed instruction set (not shown) in an instruction set of a general-purpose processor, along with associated circuitry to execute instructions, operations used by many multimedia applications may be performed using packed data in processor 1102. In at least one embodiment, many multimedia applications may be accelerated and executed more efficiently by using a full width of a processor's data bus for performing operations on packed data, which may eliminate a need to transfer smaller units of data across that processor's data bus to perform one or more operations one data element at a time.

In at least one embodiment, execution unit 1108 may also be used in microcontrollers, embedded processors, graphics devices, DSPs, and other types of logic circuits. In at least one embodiment, computer system 1100 may include, without limitation, a memory 1120. In at least one embodiment, memory 1120 may be a Dynamic Random Access Memory ("DRAM") device, a Static Random Access Memory ("SRAM") device, a flash memory device, or another memory device. In at least one embodiment, memory 1120 may store instruction(s) 1119 and/or data 1121 represented by data signals that may be executed by processor 1102.

In at least one embodiment, a system logic chip may be coupled to processor bus 1110 and memory 1120. In at least one embodiment, a system logic chip may include, without limitation, a memory controller hub ("MCH") 1116, and processor 1102 may communicate with MCH 1116 via processor bus 1110. In at least one embodiment, MCH 1116 may provide a high bandwidth memory path 1118 to memory 1120 for instruction and data storage and for storage of graphics commands, data and textures. In at least one embodiment, MCH 1116 may direct data signals between processor 1102, memory 1120, and other components in computer system 1100 and to bridge data signals between processor bus 1110, memory 1120, and a system I/O interface 1122. In at least one embodiment, a system logic chip may provide a graphics port for coupling to a graphics controller. In at least one embodiment, MCH 1116 may be coupled to memory 1120 through high bandwidth memory path 1118 and a graphics/video card 1112 may be coupled to MCH 1116 through an Accelerated Graphics Port ("AGP") interconnect 1114.

In at least one embodiment, computer system 1100 may use system I/O interface 1122 as a proprietary hub interface bus to couple MCH 1116 to an I/O controller hub ("ICH") 1130. In at least one embodiment, ICH 1130 may provide direct connections to some I/O devices via a local I/O bus. In at least one embodiment, a local I/O bus may include, without limitation, a high-speed I/O bus for connecting peripherals to memory 1120, a chipset, and processor 1102. Examples may include, without limitation, an audio controller 1129, a firmware hub ("flash BIOS") 1128, a wireless transceiver 1126, a data storage 1124, a legacy I/O controller 1123 containing user input and keyboard interfaces 1125, a serial expansion port 1127, such as a Universal Serial Bus ("USB") port, and a network controller 1134. In at least one embodiment, data storage 1124 may comprise a hard disk drive, a floppy disk drive, a CD-ROM device, a flash memory device, or other mass storage device.

In at least one embodiment, FIG. 11 illustrates a system, which includes interconnected hardware devices or "chips", whereas in other embodiments, FIG. 11 may illustrate an exemplary SoC. In at least one embodiment, devices illustrated in FIG. 11 may be interconnected with proprietary interconnects, standardized interconnects (e.g., PCIe) or some combination thereof. In at least one embodiment, one or more components of computer system 1100 are interconnected using compute express link (CXL) interconnects.

Inference and/or training logic 115 are used to perform inferencing and/or training operations associated with one or more embodiments. Details regarding inference and/or training logic 115 are provided herein in conjunction with FIGS. 1A and/or 1B. In at least one embodiment, inference and/or training logic 115 may be used in system FIG. 11 for inferencing or predicting operations based, at least in part, on weight parameters calculated using neural network training operations, neural network functions and/or architectures, or neural network use cases described herein. FIG. 11 is a block diagram of a graphics processor 1100, according to at least one embodiment. In at least one embodiment, graphics processor 1100 includes a ring interconnect 1102, a pipeline front-end 1104, a media engine 1137, and graphics cores 1180A-1180N. In at least one embodiment, ring interconnect 1102 couples graphics processor 1100 to other processing units, including other graphics processors or one or more general-purpose processor cores. In at least one embodiment, graphics processor 1100 is one of many processors integrated within a multi-core processing system.

In at least one embodiment, graphics processor 1100 receives batches of commands via ring interconnect 1102. In at least one embodiment, incoming commands are interpreted by a command streamer 1103 in pipeline front-end 1104. In at least one embodiment, graphics processor 1100 includes scalable execution logic to perform 3D geometry processing and media processing via graphics core(s) 1180A-1180N. In at least one embodiment, for 3D geometry processing commands, command streamer 1103 supplies commands to geometry pipeline 1136. In at least one embodiment, for at least some media processing commands, command streamer 1103 supplies commands to a video front end 1134, which couples with media engine 1137. In at least one embodiment, media engine 1137 includes a Video Quality Engine (VQE) 1130 for video and image post-processing and a multi-format encode/decode (MFX) 1133 engine to provide hardware-accelerated media data encoding and decoding. In at least one embodiment, geometry pipeline 1136 and media engine 1137 each generate execution threads for thread execution resources provided by at least one graphics core 1180.

In at least one embodiment, graphics processor 1100 includes scalable thread execution resources featuring graphics cores 1180A-1180N (which can be modular and are sometimes referred to as core slices), each having multiple sub-cores 1150A-50N, 1160A-1160N (sometimes referred to as core sub-slices). In at least one embodiment, graphics processor 1100 can have any number of graphics cores 1180A. In at least one embodiment, graphics processor 1100 includes a graphics core 1180A having at least a first sub-core 1150A and a second sub-core 1160A. In at least one embodiment, graphics processor 1100 is a low power processor with a single sub-core (e.g., 1150A). In at least one embodiment, graphics processor 1100 includes multiple graphics cores 1180A-1180N, each including a set of first sub-cores 1150A-1150N and a set of second sub-cores 1160A-1160N. In at least one embodiment, each sub-core in first sub-cores 1150A-1150N includes at least a first set of execution units 1152A-1152N and media/texture samplers 1154A-1154N. In at least one embodiment, each sub-core in second sub-cores 1160A-1160N includes at least a second set of execution units 1162A-1162N and samplers 1164A-1164N. In at least one embodiment, each sub-core 1150A-1150N, 1160A-1160N shares a set of shared resources 1170A-1170N. In at least one embodiment, shared resources include shared cache memory and pixel operation logic.

Inference and/or training logic 115 are used to perform inferencing and/or training operations associated with one or more embodiments. Details regarding inference and/or training logic 115 are provided herein in conjunction with FIGS. 1A and/or 1B. In at least one embodiment, inference and/or training logic 115 may be used in graphics processor 1100 for inferencing or predicting operations based, at least in part, on weight parameters calculated using neural network training operations, neural network functions and/or architectures, or neural network use cases described herein.

Figure 12:
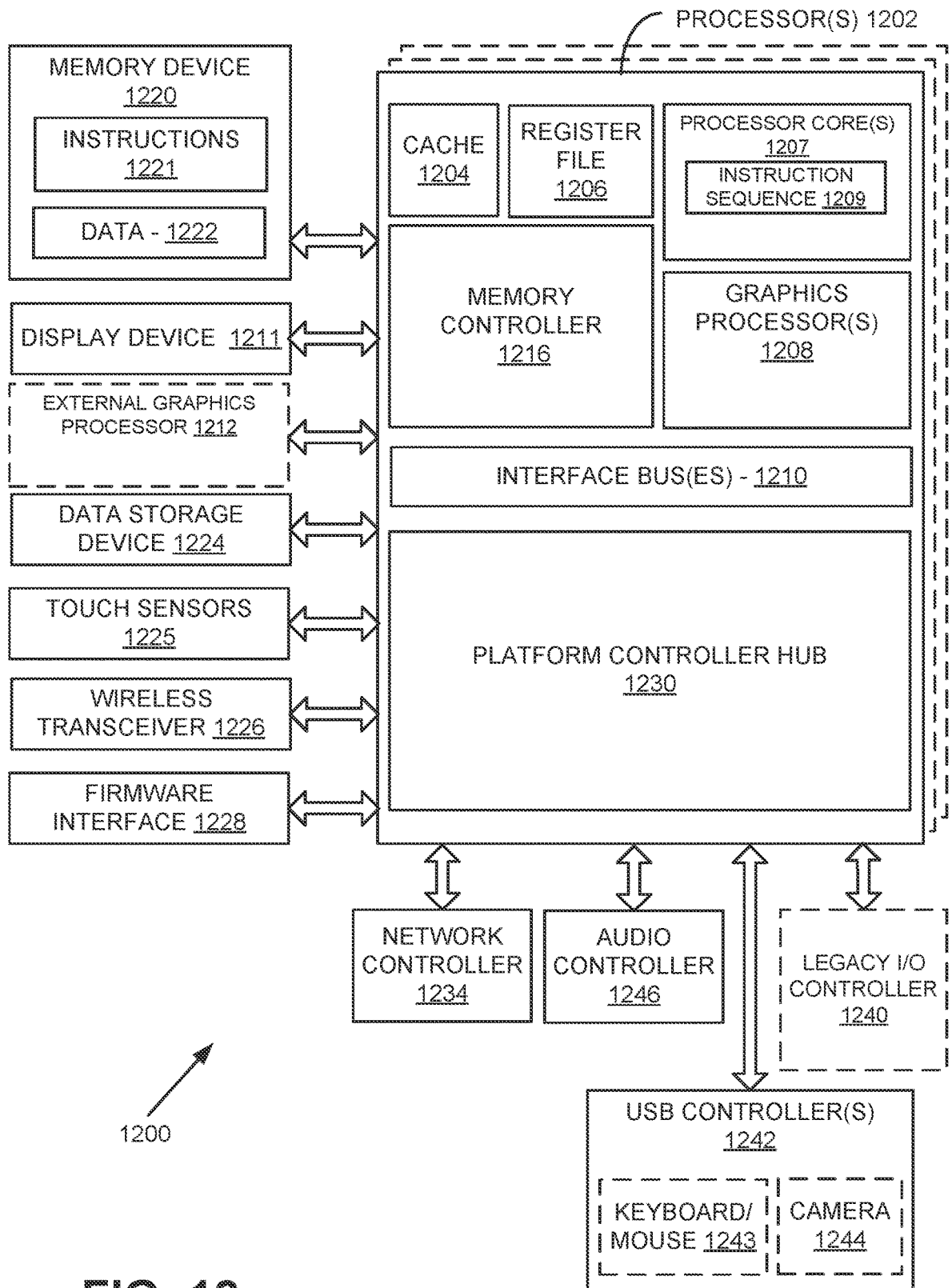
FIG. 12 illustrates at least portions of a graphics processor, according to one or more embodiments.

FIG. 12 is a block diagram of a processing system, according to at least one embodiment. In at least one embodiment, system 1200 includes one or more processors 1202 and one or more graphics processors 1208, and may be a single processor desktop system, a multiprocessor workstation system, or a server system having a large number of processors 1202 or processor cores 1207. In at least one embodiment, system 1200 is a processing platform incorporated within a system-on-a-chip (SoC) integrated circuit for use in mobile, handheld, or embedded devices.

In at least one embodiment, system 1200 can include, or be incorporated within a server-based gaming platform, a game console, including a game and media console, a mobile gaming console, a handheld game console, or an online game console. In at least one embodiment, system 1200 is a mobile phone, a smart phone, a tablet computing device or a mobile Internet device. In at least one embodiment, processing system 1200 can also include, couple with, or be integrated within a wearable device, such as a smart watch wearable device, a smart eyewear device, an augmented reality device, or a virtual reality device. In at least one embodiment, processing system 1200 is a television or set top box device having one or more processors 1202 and a graphical interface generated by one or more graphics processors 1208.

In at least one embodiment, one or more processors 1202 each include one or more processor cores 1207 to process instructions which, when executed, perform operations for system and user software. In at least one embodiment, each of one or more processor cores 1207 is configured to process a specific instruction sequence 1209. In at least one embodiment, instruction sequence 1209 may facilitate Complex Instruction Set Computing (CISC), Reduced Instruction Set Computing (RISC), or computing via a Very Long Instruction Word (VLIW). In at least one embodiment, processor cores 1207 may each process a different instruction sequence 1209, which may include instructions to facilitate emulation of other instruction sequences. In at least one embodiment, processor core 1207 may also include other processing devices, such a Digital Signal Processor (DSP).

In at least one embodiment, processor 1202 includes a cache memory 1204. In at least one embodiment, processor 1202 can have a single internal cache or multiple levels of internal cache. In at least one embodiment, cache memory is shared among various components of processor 1202. In at least one embodiment, processor 1202 also uses an external cache (e.g., a Level-3 (L3) cache or Last Level Cache (LLC)) (not shown), which may be shared among processor cores 1207 using known cache coherency techniques. In at least one embodiment, a register file 1206 is additionally included in processor 1202, which may include different types of registers for storing different types of data (e.g., integer registers, floating point registers, status registers, and an instruction pointer register). In at least one embodiment, register file 1206 may include general-purpose registers or other registers.

In at least one embodiment, one or more processor(s) 1202 are coupled with one or more interface bus(es) 1210 to transmit communication signals such as address, data, or control signals between processor 1202 and other components in system 1200. In at least one embodiment, interface bus 1210 can be a processor bus, such as a version of a Direct Media Interface (DMI) bus. In at least one embodiment, interface bus 1210 is not limited to a DMI bus, and may include one or more Peripheral Component Interconnect buses (e.g., PCI, PCI Express), memory busses, or other types of interface busses. In at least one embodiment processor(s) 1202 include an integrated memory controller 1216 and a platform controller hub 1230. In at least one embodiment, memory controller 1216 facilitates communication between a memory device and other components of system 1200, while platform controller hub (PCH) 1230 provides connections to I/O devices via a local I/O bus.

In at least one embodiment, a memory device 1220 can be a dynamic random access memory (DRAM) device, a static random access memory (SRAM) device, flash memory device, phase-change memory device, or some other memory device having suitable performance to serve as process memory. In at least one embodiment, memory device 1220 can operate as system memory for system 1200, to store data 1222 and instructions 1221 for use when one or more processors 1202 executes an application or process. In at least one embodiment, memory controller 1216 also couples with an optional external graphics processor 1212, which may communicate with one or more graphics processors 1208 in processors 1202 to perform graphics and media operations. In at least one embodiment, a display device 1211 can connect to processor(s) 1202. In at least one embodiment, display device 1211 can include one or more of an internal display device, as in a mobile electronic device or a laptop device, or an external display device attached via a display interface (e.g., DisplayPort, etc.). In at least one embodiment, display device 1211 can include a head mounted display (HMD) such as a stereoscopic display device for use in virtual reality (VR) applications or augmented reality (AR) applications.

In at least one embodiment, platform controller hub 1230 enables peripherals to connect to memory device 1220 and processor 1202 via a high-speed I/O bus. In at least one embodiment, I/O peripherals include, but are not limited to, an audio controller 1246, a network controller 1234, a firmware interface 1228, a wireless transceiver 1226, touch sensors 1225, a data storage device 1224 (e.g., hard disk drive, flash memory, etc.). In at least one embodiment, data storage device 1224 can connect via a storage interface (e.g., SATA) or via a peripheral bus, such as a Peripheral Component Interconnect bus (e.g., PCI, PCI Express). In at least one embodiment, touch sensors 1225 can include touch screen sensors, pressure sensors, or fingerprint sensors. In at least one embodiment, wireless transceiver 1226 can be a Wi-Fi transceiver, a Bluetooth transceiver, or a mobile network transceiver such as a 3G, 4G, or Long Term Evolution (LTE) transceiver. In at least one embodiment, firmware interface 1228 enables communication with system firmware, and can be, for example, a unified extensible firmware interface (UEFI). In at least one embodiment, network controller 1234 can enable a network connection to a wired network. In at least one embodiment, a high-performance network controller (not shown) couples with interface bus 1210. In at least one embodiment, audio controller 1246 is a multi-channel high definition audio controller. In at least one embodiment, system 1200 includes an optional legacy I/O controller 1240 for coupling legacy (e.g., Personal System 2 (PS/2)) devices to system 1200. In at least one embodiment, platform controller hub 1230 can also connect to one or more Universal Serial Bus (USB) controllers 1242 connect input devices, such as keyboard and mouse 1243 combinations, a camera 1244, or other USB input devices.

In at least one embodiment, an instance of memory controller 1216 and platform controller hub 1230 may be integrated into a discreet external graphics processor, such as external graphics processor 1212. In at least one embodiment, platform controller hub 1230 and/or memory controller 1216 may be external to one or more processor(s) 1202. For example, in at least one embodiment, system 1200 can include an external memory controller 1216 and platform controller hub 1230, which may be configured as a memory controller hub and peripheral controller hub within a system chipset that is in communication with processor(s) 1202.

Inference and/or training logic 115 are used to perform inferencing and/or training operations associated with one or more embodiments. Details regarding inference and/or training logic 115 are provided herein in conjunction with FIGS. 1A and/or 1B. In at least one embodiment portions or all of inference and/or training logic 115 may be incorporated into graphics processor 1200. For example, in at least one embodiment, training and/or inferencing techniques described herein may use one or more of ALUs embodied in a 3D pipeline. Moreover, in at least one embodiment, inferencing and/or training operations described herein may be done using logic other than logic illustrated in FIG. 1A or 1B. In at least one embodiment, weight parameters may be stored in on-chip or off-chip memory and/or registers (shown or not shown) that configure ALUs of graphics processor 1200 to perform one or more machine learning algorithms, neural network architectures, use cases, or training techniques described herein.

Figure 13:
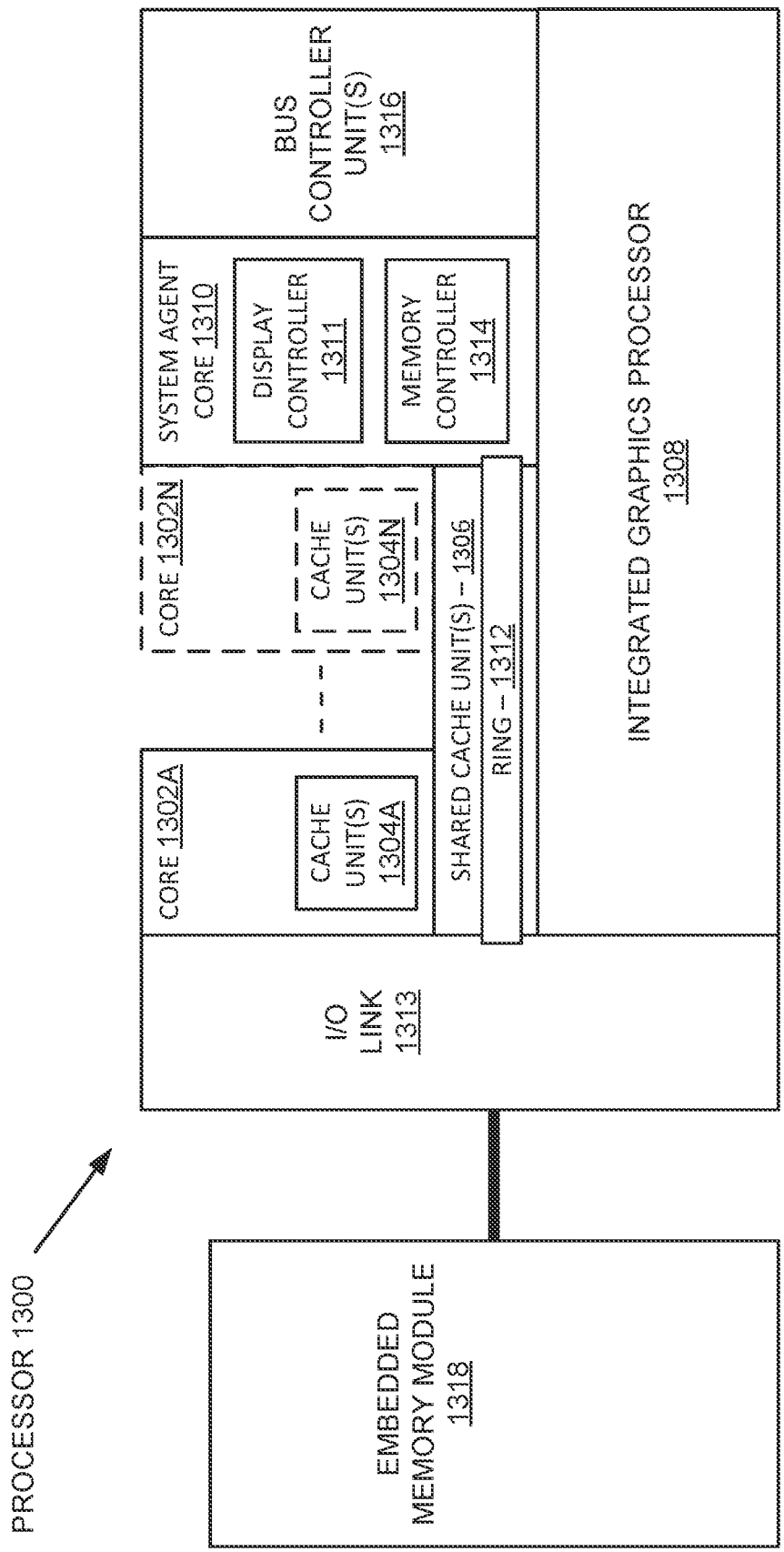
FIG. 13 illustrates at least portions of a graphics processor, according to one or more embodiments.

FIG. 13 is a block diagram of a processor 1300 having one or more processor cores 1302A-1302N, an integrated memory controller 1314, and an integrated graphics processor 1308, according to at least one embodiment. In at least one embodiment, processor 1300 can include additional cores up to and including additional core 1302N represented by dashed lined boxes. In at least one embodiment, each of processor cores 1302A-1302N includes one or more internal cache units 1304A-1304N. In at least one embodiment, each processor core also has access to one or more shared cached units 1306.

In at least one embodiment, internal cache units 1304A-1304N and shared cache units 1306 represent a cache memory hierarchy within processor 1300. In at least one embodiment, cache memory units 1304A-1304N may include at least one level of instruction and data cache within each processor core and one or more levels of shared mid-level cache, such as a Level 2 (L2), Level 3 (L3), Level 4 (L4), or other levels of cache, where a highest level of cache before external memory is classified as an LLC. In at least one embodiment, cache coherency logic maintains coherency between various cache units 1306 and 1304A-1304N.

In at least one embodiment, processor 1300 may also include a set of one or more bus controller units 1316 and a system agent core 1310. In at least one embodiment, bus controller units 1316 manage a set of peripheral buses, such as one or more PCI or PCI express busses. In at least one embodiment, system agent core 1310 provides management functionality for various processor components. In at least one embodiment, system agent core 1310 includes one or more integrated memory controllers 1314 to manage access to various external memory devices (not shown).

In at least one embodiment, one or more of processor cores 1302A-1302N include support for simultaneous multi-threading. In at least one embodiment, system agent core 1310 includes components for coordinating and operating cores 1302A-1302N during multi-threaded processing. In at least one embodiment, system agent core 1310 may additionally include a power control unit (PCU), which includes logic and components to regulate one or more power states of processor cores 1302A-1302N and graphics processor 1308.

In at least one embodiment, processor 1300 additionally includes graphics processor 1308 to execute graphics processing operations. In at least one embodiment, graphics processor 1308 couples with shared cache units 1306, and system agent core 1310, including one or more integrated memory controllers 1314. In at least one embodiment, system agent core 1310 also includes a display controller 1311 to drive graphics processor output to one or more coupled displays. In at least one embodiment, display controller 1311 may also be a separate module coupled with graphics processor 1308 via at least one interconnect, or may be integrated within graphics processor 1308.

In at least one embodiment, a ring-based interconnect unit 1312 is used to couple internal components of processor 1300. In at least one embodiment, an alternative interconnect unit may be used, such as a point-to-point interconnect, a switched interconnect, or other techniques. In at least one embodiment, graphics processor 1308 couples with ring interconnect 1312 via an I/O link 1313.

In at least one embodiment, I/O link 1313 represents at least one of multiple varieties of I/O interconnects, including an on package I/O interconnect which facilitates communication between various processor components and a high-performance embedded memory module 1318, such as an eDRAM module. In at least one embodiment, each of processor cores 1302A-1302N and graphics processor 1308 use embedded memory module 1318 as a shared Last Level Cache.

In at least one embodiment, processor cores 1302A-1302N are homogeneous cores executing a common instruction set architecture. In at least one embodiment, processor cores 1302A-1302N are heterogeneous in terms of instruction set architecture (ISA), where one or more of processor cores 1302A-1302N execute a common instruction set, while one or more other cores of processor cores 1302A-1302N executes a subset of a common instruction set or a different instruction set. In at least one embodiment, processor cores 1302A-1302N are heterogeneous in terms of microarchitecture, where one or more cores having a relatively higher power consumption couple with one or more power cores having a lower power consumption. In at least one embodiment, processor 1300 can be implemented on one or more chips or as an SoC integrated circuit.

Inference and/or training logic 115 are used to perform inferencing and/or training operations associated with one or more embodiments. Details regarding inference and/or training logic 115 are provided herein in conjunction with FIGS. 1A and/or 1B. In at least one embodiment portions or all of inference and/or training logic 115 may be incorporated into graphics processor 1310. For example, in at least one embodiment, training and/or inferencing techniques described herein may use one or more of ALUs embodied in a 3D pipeline, graphics core(s) 1302, shared function logic, or other logic in FIG. 13. Moreover, in at least one embodiment, inferencing and/or training operations described herein may be done using logic other than logic illustrated in FIG. 1A or 1B. In at least one embodiment, weight parameters may be stored in on-chip or off-chip memory and/or registers (shown or not shown) that configure ALUs of processor 1300 to perform one or more machine learning algorithms, neural network architectures, use cases, or training techniques described herein.

Figure 14:
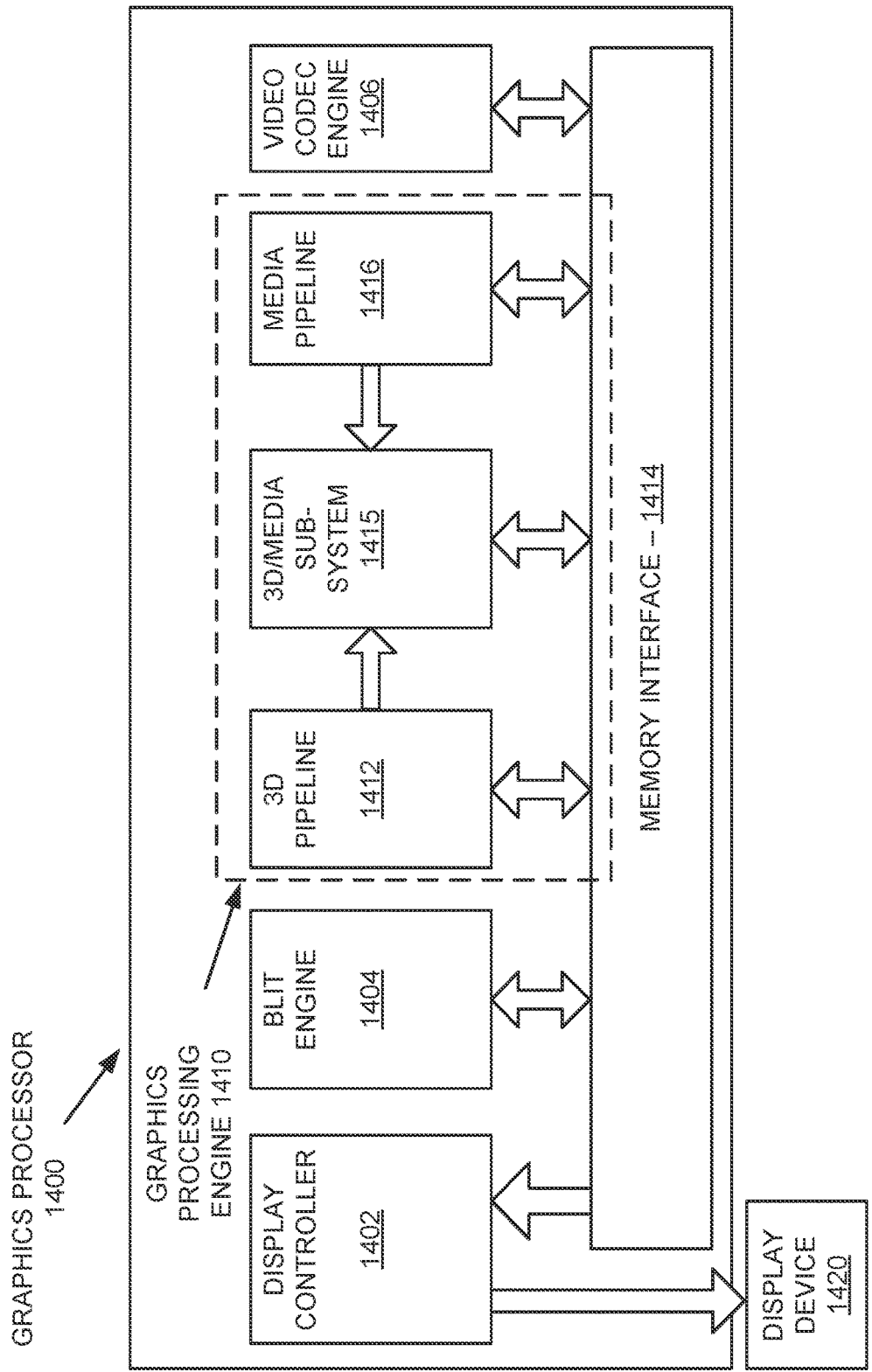
FIG. 14 illustrates at least portions of a graphics processor, according to one or more embodiments.

FIG. 14 is a block diagram of a graphics processor 1400, which may be a discrete graphics processing unit, or may be a graphics processor integrated with a plurality of processing cores. In at least one embodiment, graphics processor 1400 communicates via a memory mapped I/O interface to registers on graphics processor 1400 and with commands placed into memory. In at least one embodiment, graphics processor 1400 includes a memory interface 1414 to access memory. In at least one embodiment, memory interface 1414 is an interface to local memory, one or more internal caches, one or more shared external caches, and/or to system memory.

In at least one embodiment, graphics processor 1400 also includes a display controller 1402 to drive display output data to a display device 1420. In at least one embodiment, display controller 1402 includes hardware for one or more overlay planes for display device 1420 and composition of multiple layers of video or user interface elements. In at least one embodiment, display device 1420 can be an internal or external display device. In at least one embodiment, display device 1420 is a head mounted display device, such as a virtual reality (VR) display device or an augmented reality (AR) display device. In at least one embodiment, graphics processor 1400 includes a video codec engine 1406 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In at least one embodiment, graphics processor 1400 includes a block image transfer (BLIT) engine 1404 to perform two-dimensional (2D) rasterizer operations including, for example, bit-boundary block transfers. However, in at least one embodiment, 2D graphics operations are performed using one or more components of a graphics processing engine (GPE) 1410. In at least one embodiment, GPE 1410 is a compute engine for performing graphics operations, including three-dimensional (3D) graphics operations and media operations.

In at least one embodiment, GPE 1410 includes a 3D pipeline 1412 for performing 3D operations, such as rendering three-dimensional images and scenes using processing functions that act upon 3D primitive shapes (e.g., rectangle, triangle, etc.). In at least one embodiment, 3D pipeline 1412 includes programmable and fixed function elements that perform various tasks and/or spawn execution threads to a 3D/Media sub-system 1415. While 3D pipeline 1412 can be used to perform media operations, in at least one embodiment, GPE 1410 also includes a media pipeline 1416 that is used to perform media operations, such as video post-processing and image enhancement.

In at least one embodiment, media pipeline 1416 includes fixed function or programmable logic units to perform one or more specialized media operations, such as video decode acceleration, video de-interlacing, and video encode acceleration in place of, or on behalf of, video codec engine 1406. In at least one embodiment, media pipeline 1416 additionally includes a thread spawning unit to spawn threads for execution on 3D/Media sub-system 1415. In at least one embodiment, spawned threads perform computations for media operations on one or more graphics execution units included in 3D/Media sub-system 1415.

In at least one embodiment, 3D/Media subsystem 1415 includes logic for executing threads spawned by 3D pipeline 1412 and media pipeline 1416. In at least one embodiment, 3D pipeline 1412 and media pipeline 1416 send thread execution requests to 3D/Media subsystem 1415, which includes thread dispatch logic for arbitrating and dispatching various requests to available thread execution resources. In at least one embodiment, execution resources include an array of graphics execution units to process 3D and media threads. In at least one embodiment, 3D/Media subsystem 1415 includes one or more internal caches for thread instructions and data. In at least one embodiment, subsystem 1415 also includes shared memory, including registers and addressable memory, to share data between threads and to store output data.

Inference and/or training logic 115 are used to perform inferencing and/or training operations associated with one or more embodiments. Details regarding inference and/or training logic 115 are provided herein in conjunction with FIGS. 1A and/or 1B. In at least one embodiment portions or all of inference and/or training logic 115 may be incorporated into graphics processor 1400. For example, in at least one embodiment, training and/or inferencing techniques described herein may use one or more of ALUs embodied in 3D pipeline 1412. Moreover, in at least one embodiment, inferencing and/or training operations described herein may be done using logic other than logic illustrated in FIG. 1A or 1B. In at least one embodiment, weight parameters may be stored in on-chip or off-chip memory and/or registers (shown or not shown) that configure ALUs of graphics processor 1400 to perform one or more machine learning algorithms, neural network architectures, use cases, or training techniques described herein.

Figure 15:
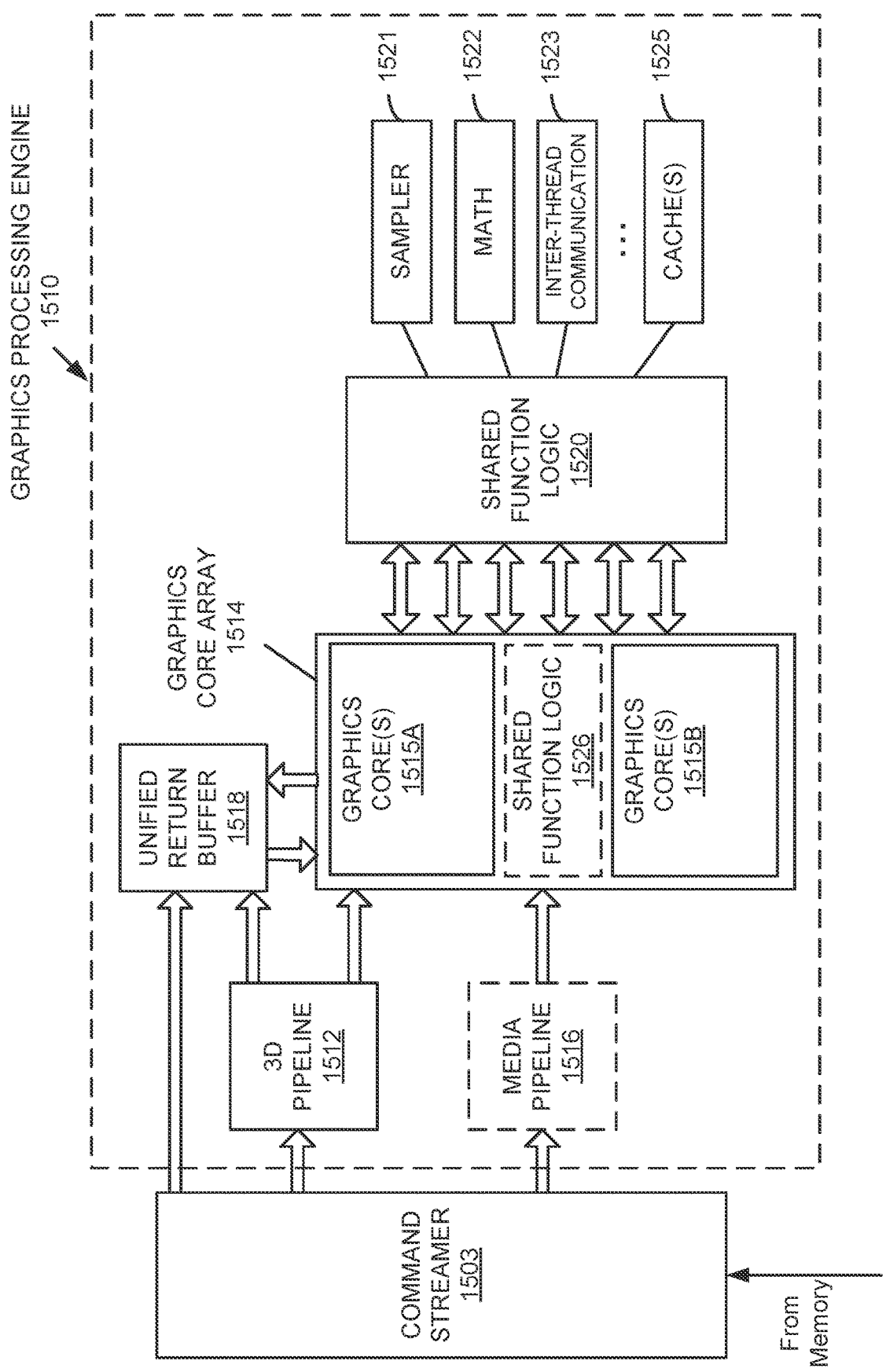
FIG. 15 is a block diagram of a graphics processing engine of a graphics processor in accordance with at least one embodiment.

FIG. 15 is a block diagram of a graphics processing engine 1510 of a graphics processor in accordance with at least one embodiment. In at least one embodiment, graphics processing engine (GPE) 1510 is a version of GPE 1410 shown in FIG. 14. In at least one embodiment, a media pipeline 1516 is optional and may not be explicitly included within GPE 1510. In at least one embodiment, a separate media and/or image processor is coupled to GPE 1510.

In at least one embodiment, GPE 1510 is coupled to or includes a command streamer 1503, which provides a command stream to a 3D pipeline 1512 and/or media pipeline 1516. In at least one embodiment, command streamer 1503 is coupled to memory, which can be system memory, or one or more of internal cache memory and shared cache memory. In at least one embodiment, command streamer 1503 receives commands from memory and sends commands to 3D pipeline 1512 and/or media pipeline 1516. In at least one embodiment, commands are instructions, primitives, or micro-operations fetched from a ring buffer, which stores commands for 3D pipeline 1512 and media pipeline 1516. In at least one embodiment, a ring buffer can additionally include batch command buffers storing batches of multiple commands. In at least one embodiment, commands for 3D pipeline 1512 can also include references to data stored in memory, such as, but not limited to, vertex and geometry data for 3D pipeline 1512 and/or image data and memory objects for media pipeline 1516. In at least one embodiment, 3D pipeline 1512 and media pipeline 1516 process commands and data by performing operations or by dispatching one or more execution threads to a graphics core array 1514. In at least one embodiment, graphics core array 1514 includes one or more blocks of graphics cores (e.g., graphics core(s) 1515A, graphics core(s) 1515B), each block including one or more graphics cores. In at least one embodiment, each graphics core includes a set of graphics execution resources that includes general-purpose and graphics specific execution logic to perform graphics and compute operations, as well as fixed function texture processing and/or machine learning and artificial intelligence acceleration logic, including inference and/or training logic 115 in FIG. 1A and FIG. 1B.

In at least one embodiment, 3D pipeline 1512 includes fixed function and programmable logic to process one or more shader programs, such as vertex shaders, geometry shaders, pixel shaders, fragment shaders, compute shaders, or other shader programs, by processing instructions and dispatching execution threads to graphics core array 1514. In at least one embodiment, graphics core array 1514 provides a unified block of execution resources for use in processing shader programs. In at least one embodiment, a multi-purpose execution logic (e.g., execution units) within graphics core(s) 1515A-2315B of graphic core array 1514 includes support for various 3D API shader languages and can execute multiple simultaneous execution threads associated with multiple shaders.

In at least one embodiment, graphics core array 1514 also includes execution logic to perform media functions, such as video and/or image processing. In at least one embodiment, execution units additionally include general-purpose logic that is programmable to perform parallel general-purpose computational operations, in addition to graphics processing operations.

In at least one embodiment, output data generated by threads executing on graphics core array 1514 can output data to memory in a unified return buffer (URB) 1518. In at least one embodiment, URB 1518 can store data for multiple threads. In at least one embodiment, URB 1518 may be used to send data between different threads executing on graphics core array 1514. In at least one embodiment, URB 1518 may additionally be used for synchronization between threads on graphics core array 1514 and fixed function logic within shared function logic 1520.

In at least one embodiment, graphics core array 1514 is scalable, such that graphics core array 1514 includes a variable number of graphics cores, each having a variable number of execution units based on a target power and performance level of GPE 1510. In at least one embodiment, execution resources are dynamically scalable, such that execution resources may be enabled or disabled as needed.

In at least one embodiment, graphics core array 1514 is coupled to shared function logic 1520 that includes multiple resources that are shared between graphics cores in graphics core array 1514. In at least one embodiment, shared functions performed by shared function logic 1520 are embodied in hardware logic units that provide specialized supplemental functionality to graphics core array 1514. In at least one embodiment, shared function logic 1520 includes but is not limited to a sampler unit 1521, a math unit 1522, and inter-thread communication (ITC) logic 1523. In at least one embodiment, one or more cache(s) 1525 are included in, or coupled to, shared function logic 1520.

In at least one embodiment, a shared function is used if demand for a specialized function is insufficient for inclusion within graphics core array 1514. In at least one embodiment, a single instantiation of a specialized function is used in shared function logic 1520 and shared among other execution resources within graphics core array 1514. In at least one embodiment, specific shared functions within shared function logic 1520 that are used extensively by graphics core array 1514 may be included within shared function logic 3216 within graphics core array 1514. In at least one embodiment, shared function logic 3216 within graphics core array 1514 can include some or all logic within shared function logic 1520. In at least one embodiment, all logic elements within shared function logic 1520 may be duplicated within shared function logic 1526 of graphics core array 1514. In at least one embodiment, shared function logic 1520 is excluded in favor of shared function logic 1526 within graphics core array 1514.

Inference and/or training logic 115 are used to perform inferencing and/or training operations associated with one or more embodiments. Details regarding inference and/or training logic 115 are provided herein in conjunction with FIGS. 1A and/or 1B. In at least one embodiment portions or all of inference and/or training logic 115 may be incorporated into graphics processor 1510. For example, in at least one embodiment, training and/or inferencing techniques described herein may use one or more of ALUs embodied in 3D pipeline 1512, graphics core(s) 1515, shared function logic 1526, shared function logic 1520, or other logic in FIG. 15. Moreover, in at least one embodiment, inferencing and/or training operations described herein may be done using logic other than logic illustrated in FIG. 1A or 1B. In at least one embodiment, weight parameters may be stored in on-chip or off-chip memory and/or registers (shown or not shown) that configure ALUs of graphics processor 1510 to perform one or more machine learning algorithms, neural network architectures, use cases, or training techniques described herein.

At least one embodiment of the disclosure can be described in view of the following clauses:

In at least one embodiment, a single semiconductor platform may refer to a sole unitary semiconductor-based integrated circuit or chip. In at least one embodiment, multi-chip modules may be used with increased connectivity which simulate on-chip operation, and make substantial improvements over utilizing a conventional central processing unit ("CPU") and bus implementation. In at least one embodiment, various modules may also be situated separately or in various combinations of semiconductor platforms per desires of user.

In at least one embodiment, referring back to FIG. 13, computer programs in form of machine-readable executable code or computer control logic algorithms are stored in main memory 1304 and/or secondary storage. Computer programs, if executed by one or more processors, enable system 1300 to perform various functions in accordance with at least one embodiment. In at least one embodiment, memory 1304, storage, and/or any other storage are possible examples of computer-readable media. In at least one embodiment, secondary storage may refer to any suitable storage device or system such as a hard disk drive and/or a removable storage drive, representing a floppy disk drive, a magnetic tape drive, a compact disk drive, digital versatile disk ("DVD") drive, recording device, universal serial bus ("USB") flash memory, etc. In at least one embodiment, architecture and/or functionality of various previous figures are implemented in context of CPU 1302, parallel processing system 1312, an integrated circuit capable of at least a portion of capabilities of both CPU 1302, parallel processing system 1312, a chipset (e.g., a group of integrated circuits designed to work and sold as a unit for performing related functions, etc.), and/or any suitable combination of integrated circuit(s).

In at least one embodiment, architecture and/or functionality of various previous figures are implemented in context of a general computer system, a circuit board system, a game console system dedicated for entertainment purposes, an application-specific system, and more. In at least one embodiment, computer system 1300 may take form of a desktop computer, a laptop computer, a tablet computer, servers, supercomputers, a smart-phone (e.g., a wireless, hand-held device), personal digital assistant ("PDA"), a digital camera, a vehicle, a head mounted display, a hand-held electronic device, a mobile phone device, a television, workstation, game consoles, embedded system, and/or any other type of logic.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one embodiment, use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). In at least one embodiment, number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. In at least one embodiment, set of non-transitory computer-readable storage media comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. In at least one embodiment, process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or interprocess communication mechanism.

Although descriptions herein set forth example implementations of described techniques, other architectures may be used to implement described functionality, and are intended to be within scope of this disclosure. Furthermore, although specific distributions of responsibilities may be defined above for purposes of description, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A method comprising:
   receiving telemetry data for a device, wherein the telemetry data is indicative of at least one aspect of an operation of the device;
   processing an input based on the telemetry data using a plurality of trained machine learning models to generate a plurality of error predictions, wherein the plurality of trained machine learning models comprises:
      a first trained machine learning model that outputs a first error prediction of the plurality of error predictions, the first error prediction comprising a first probability of an error occurring within a first future time period; and
      a second trained machine learning model that outputs a second error prediction of the plurality of error predictions, the second error prediction comprising a second probability of an error occurring within a second future time period, wherein the first future time period is different from the second future time period;
   determining whether to perform a preventative action on the device based on the plurality of error predictions; and
   in response to determining to perform the preventative action, causing the preventative action to be performed on the device.

2. The method of claim 1, wherein the first error prediction identifies a type of potential error that will occur within the first future time period, and wherein the second error prediction identifies a type of potential error that will occur within the second future time period.

3. The method of claim 1, wherein the plurality of trained machine learning models further comprises:
   a third trained machine learning model that outputs a third error prediction of the plurality of error predictions, the third error prediction comprising a third probability of an error occurring within a third future time period, wherein the third future time period is different from the first future time period and the second future time period; and
   a fourth trained machine learning model that outputs a fourth error prediction of the plurality of error predictions, the fourth error prediction comprising a fourth probability of an error occurring within a fourth future time period, wherein the fourth future time period is different from the first future time period, the second future time period, and the third future time period.

4. The method of claim 1, wherein each of the plurality of trained machine learning models comprises a recurrent neural network.

5. The method of claim 1, wherein the device comprises a graphical processing unit.

6. The method of claim 1, further comprising:
   determining when to perform the preventative action based on the plurality of error predictions.

7. The method of claim 1, further comprising:
   periodically retraining the plurality of trained machine learning models based on telemetry data for a plurality of devices that share a common device type that was generated after the plurality of trained machine learning models were last trained.

8. The method of claim 1, wherein the telemetry data comprises a first parameter and a second set of parameters, the method further comprising:
   determining a first value of the first parameter from the telemetry data;
   estimating a second value for the first parameter based on inputting the values of the second set of parameters into a function that relates the first parameter to the second set of parameters;
   determining a difference between the first value and the second value; and
   determining whether an anomaly is detected based on the difference between the first value and the second value.

9. The method of claim 1, wherein performing the preventative action comprises providing a notification that the device is predicted to experience at least one of an error, a fault, or failure within the first future time period or the second future time period.

10. A non-transitory computer-readable medium comprising instructions that, responsive to execution by a processing device, cause the processing device to perform operations comprising:
    receiving historical telemetry data for a plurality of devices that share a common device type;
    training a plurality of machine learning models to generate error predictions for devices having the device type based on the historical telemetry data, wherein training the plurality of machine learning models comprises:
       training a first machine learning model to output a first error prediction comprising a first probability of an error occurring within a first time period; and
       training a second machine learning model to output a second error prediction comprising a second probability of an error occurring within a second time period, wherein the first time period is different from the second time period, and wherein the first error prediction and the second error prediction are to be used to determine whether to perform a preventive action on a device having the device type and causing the preventive action to be performed on the device having the device type.

11. The non-transitory computer-readable medium of claim 10, wherein the plurality of devices comprise a plurality of graphical processing units of a data center.

12. The non-transitory computer-readable medium of claim 10, further causing the processing device to perform operations comprising:
    processing an input based on telemetry data for a device of the plurality of devices using the trained plurality of machine learning models to output the first error prediction and the second error prediction; and
    determining whether to perform a preventative action on the device based on the first error prediction and the second error prediction.

13. The non-transitory computer-readable medium of claim 10, wherein the first error prediction identifies a type of potential error that is estimated to occur within the first time period, and wherein the second error prediction identifies a type of potential error that is estimated to occur within the second time period.

14. The non-transitory computer-readable medium of claim 10, wherein training the plurality of machine learning models further comprises:
training a third machine learning model to output a third error prediction comprising a third probability of an error occurring within a third time period, wherein the third time period is different from the first time period and the second time period; and
training a fourth machine learning model to output a fourth error prediction comprising a fourth probability of an error occurring within a fourth time period, wherein the fourth time period is different from the first time period, the second time period, and the third time period.

15. The non-transitory computer-readable medium of claim 10, further causing the processing device to perform operations comprising:
periodically retraining the plurality of machine learning models based on telemetry data for the plurality of devices that was generated after the plurality of machine learning models were last trained.

16. A system comprising:
a memory device; and
a processing device coupled to the memory device, wherein the processing device is to perform operations comprising:
for each device of a plurality of devices of a data center, perform the following:
receive telemetry data indicative of at least one aspect of an operation of the device, wherein the telemetry data comprises a first parameter and a second set of parameters;
determine a first value of the first parameter from the telemetry data;
estimate a second value for the first parameter based on inputting the values of the second set of parameters into a function that relates the first parameter to the second set of parameters;
determine a difference between the first value and the second value;
determine whether an anomaly is detected based at least in part on the difference between the first value and the second value;
determine whether to perform a preventative action on the device based on determining that the anomaly is detected; and
in response to determining to perform the preventative action, causing the preventative action to be performed on the device.

17. The system of claim 16, wherein the processing device is further to:
generate the function using historical telemetry data; and
periodically update the function using additional telemetry data received after the function was generated.

18. The system of claim 17, wherein the processing device is further to:
estimate values for one or more additional parameters of the telemetry data from other parameters of the telemetry data using one or more additional functions;
determine differences between the estimated values and measured values for the one or more additional parameters; and
determine an anomaly score of the device based on a combination of the difference and the one or more additional differences;
determine whether the anomaly is detected based on the anomaly score.

19. The system of claim 18, wherein the processing device is further to:
determine a level of the anomaly of the device based on a location of the anomaly score of the device on a Gaussian distribution.

20. The system of claim 17, wherein the processing device is further to:
process an input based on the telemetry data using a plurality of trained machine learning models to generate a plurality of error predictions, wherein the plurality of trained machine learning models comprises:
a first trained machine learning model that outputs a first error prediction of the plurality of error predictions, the first error prediction comprising a first probability of an error occurring within a first future time period; and
a second trained machine learning model that outputs a second error prediction of the plurality of error predictions, the second error prediction comprising a second probability of an error occurring within a second future time period; and
determine whether to perform a preventative action on the device based on the plurality of error predictions.

21. The system of claim 20, wherein the processing device is further to:
determine when to perform the preventative action based on the plurality of error predictions.

* * * * *

UNITED STATES PATENT AND TRADEMARK OFFICE
CERTIFICATE OF CORRECTION

| | |
|---|---|
| PATENT NO. | : 12,055,995 B2 |
| APPLICATION NO. | : 17/683191 |
| DATED | : August 6, 2024 |
| INVENTOR(S) | : Tamar Viclizki et al. |

It is certified that error appears in the above-identified patent and that said Letters Patent is hereby corrected as shown below:

In the Claims

In Claim 18, Column 46, Line 19 please insert --and-- after the ";"

Signed and Sealed this
Tenth Day of December, 2024

*Katherine Kelly Vidal*

Katherine Kelly Vidal
*Director of the United States Patent and Trademark Office*